United States Patent
Matsutani

(10) Patent No.: US 8,073,314 B2
(45) Date of Patent: Dec. 6, 2011

(54) RECORDING DEVICE FOR RECORDING BROADCASTED INFORMATION

(75) Inventor: Atsushi Matsutani, Tokyo (JP)

(73) Assignee: Sony Corporation, Tokyo (JP)

(*) Notice: Subject to any disclaimer, the term of this patent is extended or adjusted under 35 U.S.C. 154(b) by 1126 days.

(21) Appl. No.: 10/586,639

(22) PCT Filed: Feb. 3, 2005

(86) PCT No.: PCT/JP2005/001975
§ 371 (c)(1),
(2), (4) Date: Jul. 19, 2006

(87) PCT Pub. No.: WO2005/076504
PCT Pub. Date: Aug. 18, 2005

(65) Prior Publication Data
US 2009/0185785 A1 Jul. 23, 2009

(30) Foreign Application Priority Data

Feb. 10, 2004 (JP) ................................ 2004-033688
May 19, 2004 (JP) ................................ 2004-149498

(51) Int. Cl.
*H04N 5/76* (2006.01)
(52) U.S. Cl. .......................................... 386/297; 725/54
(58) Field of Classification Search .................... 725/39, 725/48, 49, 50, 51, 53, 54; 386/83
See application file for complete search history.

(56) References Cited

U.S. PATENT DOCUMENTS

| | | | |
|---|---|---|---|
| 4,908,713 A * | 3/1990 | Levine | 386/83 |
| 6,317,784 B1 | 11/2001 | MacKintosh et al. | |
| 6,405,239 B1 * | 6/2002 | Addington et al. | 709/203 |
| 6,628,928 B1 * | 9/2003 | Crosby et al. | 455/77 |
| 7,188,356 B1 * | 3/2007 | Miura et al. | 725/46 |
| 7,665,108 B2 * | 2/2010 | Park et al. | 725/51 |
| 7,930,723 B2 * | 4/2011 | Mikkelson et al. | 725/86 |
| 2003/0051241 A1 | 3/2003 | Klosterman et al. | |
| 2003/0061618 A1* | 3/2003 | Horiuchi et al. | 725/87 |
| 2003/0093795 A1* | 5/2003 | Takahashi et al. | 725/49 |
| 2005/0028205 A1* | 2/2005 | Nishimura et al. | 725/46 |
| 2006/0059095 A1* | 3/2006 | Akins et al. | 705/51 |
| 2006/0193599 A1* | 8/2006 | Thijssen | 386/83 |
| 2007/0072542 A1* | 3/2007 | Haagen | 455/3.06 |

(Continued)

FOREIGN PATENT DOCUMENTS

AU     2003/1000733     * 10/2003

(Continued)

*Primary Examiner* — David Harvey
(74) *Attorney, Agent, or Firm* — Oblon, Spivak, McClelland, Maier & Neustadt, L.L.P.

(57) ABSTRACT

A recording apparatus is provided that includes a broadcast signal receiving means for receiving a broadcast signal transmitted from a broadcasting station and a setting means for setting at least a broadcasting time period and a broadcasting station. The recording apparatus has a communication means for transmitting request information to an external device and for receiving reply information from the external device and a program table creation means for creating a program table based on the reply information. The apparatus further has a recording scheduling means for scheduling the recording of a program to be broadcast from the broadcasting station set by the setting means based on the title and broadcasting date and time of the selected previously broadcasted program when a program previously broadcasted during the broadcasting time period set by the setting means is selected from the program table.

8 Claims, 28 Drawing Sheets

U.S. PATENT DOCUMENTS

2007/0277201 A1 * 11/2007 Wong et al. .................. 725/40

FOREIGN PATENT DOCUMENTS

| | | |
|---|---|---|
| JP | 58-210776 | 12/1983 |
| JP | 62-60377 | 3/1987 |
| JP | 5-284480 | 10/1993 |
| JP | 8-102922 | 4/1996 |
| JP | 8-214282 | 8/1996 |
| JP | 8-275077 | 10/1996 |
| JP | 9-214807 | 8/1997 |
| JP | 9-214870 | 8/1997 |
| JP | 10-177532 | 6/1998 |
| JP | 10-269752 | 10/1998 |
| JP | 10-290441 | 10/1998 |
| JP | 10-336534 | 12/1998 |
| JP | 11-27622 | 1/1999 |
| JP | 2000-269904 | 9/2000 |
| JP | 2001-125914 | 5/2001 |
| JP | 2001-144699 | 5/2001 |
| JP | 2001-256693 | 9/2001 |
| JP | 2002-142197 | 5/2002 |
| JP | 11-518342 | 6/2003 |
| JP | 2003-208369 | 7/2003 |
| JP | 2003-319271 | * 11/2003 |
| JP | 2004-538725 | 12/2004 |
| WO | WO 00/52928 | 9/2000 |
| WO | WO 02/082808 | * 10/2002 |

* cited by examiner

SV2

SV3

TB1 ONGOING PROGRAM TABLE

| STATION NAME | PROGRAM TITLE | CAST (DJ) | SONG START TIME | SONG TITLE | ARTIST | GENRE |
|---|---|---|---|---|---|---|
| FM NAKAHARA | MY MY RADIO | TOTAL MASUMOTO | 12/1 20:59 | BEYOND THE SKY | SUMASHIGAO | POPS |

TB2 BROADCASTED MUSIC TABLE

| STATION NAME | BROADCASTING TIME | SONG TITLE | ARTIST | GENRE |
|---|---|---|---|---|
| ... | ... | ... | ... | ... |
| FM NAKAHARA | 12/1 20:05 | DORA DORA DORA | NAX | ROCK |
| FM NAKAHARA | 12/1 20:09 | BLUE TRIANGLE | DJC | ROCK |
| FM NAKAHARA | 12/1 20:25 | ON ROSE HILL | Tiger Ash | ROCK |
| FM NAKAHARA | 12/1 20:33 | NO. 2 | KAZUYUKI AKIHARA | POPS |
| FM NAKAHARA | 12/1 20:37 | TO ME | AMI HAMAZAKI | POPS |
| FM NAKAHARA | 12/1 20:41 | Led Wine'89 | CLNetwork | POPS |
| FM NAKAHARA | 12/1 20:50 | PILLOW | AOTARO KOMIYAMA | POPS |
| FM NAKAHARA | 12/1 20:55 | WINTER | ARUKU en Cell | ROCK |

TB3 BROADCASTED PROGRAM TABLE

| STATION NAME | BROADCASTING TIME | PROGRAM TITLE | CAST (DJ) |
|---|---|---|---|
| ... | ... | ... | ... |
| FM NAKAHARA | 12/1 19:00~20:00 | WORLD BEAT | SOBAT NINPULSE |
| FM NAKAHARA | 12/1 20:00~20:30 | Rock On | CLIS PEPPER |
| FM NAKAHARA | 12/1 20:30~20:45 | SLOW NIGHT | JOHN GABARA |

FIG. 20

| STATION NAME | PROGRAM TITLE | CAST (DJ) | SONG START TIME | SONG TITLE | ARTIST | GENRE |
|---|---|---|---|---|---|---|
| FM NAKAHARA | MY MY RADIO | TOTAL MASUMOTO | 12/1 20:59 | BEYOND THE SKY | SUMASHIGAO | POPS |

TB1

↓ UPDATE WHEN SONG IS SWITCHED

| STATION NAME | PROGRAM TITLE | CAST (DJ) | SONG START TIME | SONG TITLE | ARTIST | GENRE |
|---|---|---|---|---|---|---|
| FM NAKAHARA | MY MY RADIO | TOTAL MASUMOTO | 12/1 21:05 | FLOWER OF MOON | NAKASHIMA RIKA | POPS |

| STATION NAME | BROADCASTING TIME | SONG TITLE | ARTIST | GENRE |
|---|---|---|---|---|
| ⋮ | ⋮ | ⋮ | ⋮ | ⋮ |
| FM NAKAHARA | 12/1 20:05 | DORA DORA DORA | NAX | ROCK |
| FM NAKAHARA | 12/1 20:09 | BLUE TRIANGLE | DJC | ROCK |
| FM NAKAHARA | 12/1 20:25 | ON ROSE HILL | Tiger Ash | ROCK |
| FM NAKAHARA | 12/1 20:33 | NO. 2 | KAZUYUKI AKIHARA | POPS |
| FM NAKAHARA | 12/1 20:37 | TO ME | AMI HAMAZAKI | POPS |
| FM NAKAHARA | 12/1 20:41 | Led Wine'89 | CLNetwork | POPS |
| FM NAKAHARA | 12/1 20:50 | PILLOW | AOTARO KOMIYAMA | POPS |
| FM NAKAHARA | 12/1 20:55 | WINTER | ARUKU en Cell | ROCK |
| FM NAKAHARA | 12/1 20:59 | ABOVE SKY | SUMASHIGAO | POPS |

— ADD A PRESCRIBED TIME PERIOD AFTER PROGRAM ENDS

| STATION NAME | BROADCASTING TIME | PROGRAM TITLE | CAST (DJ) |
|---|---|---|---|
| ⋮ | ⋮ | ⋮ | ⋮ |
| FM NAKAHARA | 12/1 19:00~20:00 | WORLD BEAT | SOBAT NINPULSE |
| FM NAKAHARA | 12/1 20:00~20:30 | Rock On | CLIS PEPPER |
| FM NAKAHARA | 12/1 20:30~20:45 | SLOW NIGHT | JOHN CABARA |
| FM NAKAHARA | 12/1 20:45~21:30 | MY MY RADIO | TOTAL MASUMOTO |

— ADD A PRESCRIBED TIME PERIOD AFTER PROGRAM ENDS

FIG. 23

| STATION NAME | BROADCASTING TIME | PROGRAM TITLE | CAST (DJ) | SONG START TIME | SONG TITLE | ARTIST | GENRE |
|---|---|---|---|---|---|---|---|
| ... | ... | ... | ... | ... | ... | ... | ... |
| FM NAKAHARA | 12/1 20:00~20:30 | Rock On | CLIS PEPPER | 12/1 20:05 | DORA DORA DORA | NAX | ROCK |
| FM NAKAHARA | 12/1 20:00~20:30 | Rock On | CLIS PEPPER | 12/1 20:09 | BLUE TRIANGLE | DJC | ROCK |
| FM NAKAHARA | 12/1 20:00~20:30 | Rock On | CLIS PEPPER | 12/1 20:25 | ON ROSE HILL | Tiger Ash | ROCK |
| FM NAKAHARA | 12/1 20:30~20:45 | SLOW NIGHT | JOHN KABARA | 12/1 20:33 | NO.2 | KAZUYUKI AKIHARA | POPS |
| FM NAKAHARA | 12/1 20:30~20:45 | SLOW NIGHT | JOHN KABARA | 12/1 20:37 | TO ME | AMI HAMAZAKI | POPS |
| FM NAKAHARA | 12/1 20:30~20:45 | SLOW NIGHT | JOHN KABARA | 12/1 20:41 | Led Wine'89 | CLNetwork | POPS |
| ... | ... | ... | ... | ... | ... | ... | ... |

FIG. 24

| STATION NAME | BROADCASTING TIME | PROGRAM TITLE | CAST (DJ) | SONG START TIME | SONG TITLE | ARTIST | GENRE |
|---|---|---|---|---|---|---|---|
| ... | ... | ... | ... | ... | ... | ... | ... |
| FM NAKAHARA | 12/1 20:00~20:30 | Rock On | CLIS PEPPER | 12/1 20:05 | DORA DORA DORA | NAX | ROCK |
| FM NAKAHARA | 12/1 20:00~20:30 | Rock On | CLIS PEPPER | 12/1 20:09 | BLUE TRIANGLE | DJG | ROCK |
| FM NAKAHARA | 12/1 20:00~20:30 | Rock On | CLIS PEPPER | 12/1 20:25 | ON ROSE HILL | Tiger Ash | ROCK |
| FM NAKAHARA | 12/1 20:30~20:45 | SLOW NIGHT | JOHN KABARA | 12/1 20:33 | NO. 2 | KAZUYUKI AKIHARA | POPS |
| FM NAKAHARA | 12/1 20:30~20:45 | SLOW NIGHT | JOHN KABARA | 12/1 20:37 | TO ME | AMI HAMAZAKI | POPS |
| FM NAKAHARA | 12/1 20:30~20:45 | SLOW NIGHT | JOHN KABARA | 12/1 20:41 | Led Wine'89 | CLNetwork | POPS |
| ... | ... | ... | ... | ... | ... | ... | ... |

ODB (NODB)

FIG. 26

| | FM NAKAHARA | FM OZAKI | FM NY [SET] PB |
|---|---|---|---|
| 12/1 (MON) | [RECORD ☑] CB<br>20:00~20:30<br>Rock On (GLIS PEPPER)<br><br>20:05~ DORA DORA DORA (NAX)<br>20:09~ BLUE TRIANGLE (DJC)<br>20:25~ ON ROSE HILL (Tiger Ash)<br><br>[RECORD ☐]<br>20:30~20:45<br>SLOW NIGHT (JOHN KABARA)<br><br>20:33~ ALBUM (KOMURO NAMI)<br>20:37~ SNOW ON GROUND (NAKASHIMA MIYUKI)<br>20:41~ HELLO (KOYANAGI RUMI)<br>... | CB<br>[RECORD ☐]<br>20:00~20:45<br>COOL MIDNIGHT (TAMORI)<br><br>20:03~ A ROAD HOUSE (ORANGE RAIN)<br>20:07~ MEMORY (SP1DS)<br>20:15~ SO FAR (SUZUKI TADASHI)<br>20:20~ START (NAKASHIMA MIKI)<br>20:25~ SPRING RAINBOW (YANO KYOKO)<br>... | CB<br>301<br>[RECORD ☐]<br>20:00~20:15<br>GETS! (DADY)<br><br>20:08~ TOMORROW (TAKEUCHI MARIKO)<br><br>[RECORD ☐]<br>20:15~20:45<br>LET'S MOVE ON (OSPY)<br><br>20:20~ CHERRY BLOSSOMS (CRY and JUMP)<br>20:24~ FOR ME (CHILD)<br>20:40~ HUMMING HEART (HAND HAND)<br>... |
| 12/2 (TUE) | ... | ... | ... |

RECORDING DEVICE FOR RECORDING BROADCASTED INFORMATION

TECHNICAL FIELD

This invention relates to a recording apparatus, and more particularly, is suitably applied to an audio recording apparatus for recording the audio of radio programs, for example.

BACKGROUND ART

Recently audio recording apparatus for recording the audio of radio programs and video recording apparatus for recording the video of television programs have been widely used as recording apparatus.

After letting a user to specify a broadcasting station and time, such audio recording apparatus selects the specified broadcasting station at the time and starts to record the audio of a radio program that is broadcasted from the broadcasting station.

The video recording apparatus, on the other hand, obtains electronic program guide information from a broadcasting satellite, displays the electronic program guide information on a prescribed display unit to let a user select a desired television program, and records the video of the selected television program, the electronic program guide information showing the summaries of television programs including program titles and broadcasting times (for example, refer to patent reference 1).

Patent Reference 1 Japanese Patent Application Publication No. 11-284962

By the way, the above audio recording apparatus does not show users information on radio programs. Therefore, the users should check a radio program table on paper or magazines, or the like, to thereby confirm the broadcasting stations and times of desired radio programs before recording the radio programs.

The above video recording apparatus, on the other hand, is capable of showing users electronic program guide information on television programs. The electronic program guide information, however, includes only the summaries of television programs, such as program titles and broadcasting times. Such electronic program guide information is not enough for users to know details on the television programs. Therefore, the user can only guess the contents of the television programs from the electronic program guide information to select television programs to be recorded.

As described above, the above recording apparatus has a drawback that users cannot know details on programs and select preferable programs for recording.

DISCLOSURE OF THE INVENTION

This invention has been considered in view of the foregoing and intends to propose an improved recording apparatus that allows more preferable programs to be selected for recording.

To solve the above problem, a recording apparatus according to this invention is provided with: a broadcast signal receiving means for receiving a broadcast signal from a broadcasting station; a setting means for setting at least a broadcasting station; a communication means for transmitting request information to an external device and receiving reply information that is returned from the external device in response to the request information, the request information requesting at least the titles of programs broadcasted from the set broadcasting station, the broadcasting times of the programs, and the titles of content broadcasted in the programs; and a program table creation means for creating a program table based on the reply information.

Further, a recording method according to this invention is provided with: a broadcast signal reception step of receiving a broadcast signal from a broadcasting station; a setting step of setting at least a broadcasting station; a communication step of transmitting request information to an external device and receiving reply information that is returned from the external device in response to the request information, the request information requesting at least the titles of programs broadcasted from the set broadcasting station, the broadcasting times of the programs, and the titles of content broadcasted in the programs; and a program table creation step of creating a program table based on the reply information.

Still further, a recording program according to this invention causes an information processing apparatus to execute: a broadcast signal reception step of receiving a broadcast signal from a broadcasting station; a setting step of setting at least a broadcasting station; a communication step of transmitting request information to an external device and receiving reply information that is returned from the external device in response to the request information, the request information requesting at least the titles of programs broadcasted from the set broadcasting station, the broadcasting times of the programs, and the titles of content broadcasted in the programs; and a program table creation step of creating a program table based on the reply information.

As described above, a program table is created based on reply information including the summaries of programs including the titles and broadcasting times of the programs and the details on the programs such as the titles of the content broadcasted in the programs. This can show the program table including the summaries and details of the program content to users to thereby allow the users to select programs to be recorded.

According to this invention, a program table is created based on reply information including the summaries of programs including the titles and broadcasting times of the programs and the details on the programs such as the titles of content broadcasted in the programs. This can show the program table including the summaries and details of the program content to users to thereby allow the users to select programs to be recorded, thus making it possible to realize an improved recording apparatus which allows more preferable programs to be selected for recording.

BRIEF DESCRIPTION OF DRAWINGS

FIG. 20 is a schematic diagram showing a configuration of a radio broadcast information database.

FIG. 21 is a schematic diagram showing how to update Now On Air information in an ongoing program table.

FIG. 22 is a schematic diagram showing how to update On Air list information in a broadcasted music table.

FIG. 23 is a schematic diagram showing how to update On Air list information in a broadcasted program table.

FIG. 24 is a schematic diagram showing how to associate the broadcasted music table with the broadcasted program table.

FIG. 26 is a schematic diagram showing a structure of an On Air list information (Now On Air information) database.

FIG. 31 is a schematic diagram showing a structure of a program table screen.

BEST MODE FOR CARRYING OUT THE INVENTION

Figure 1:
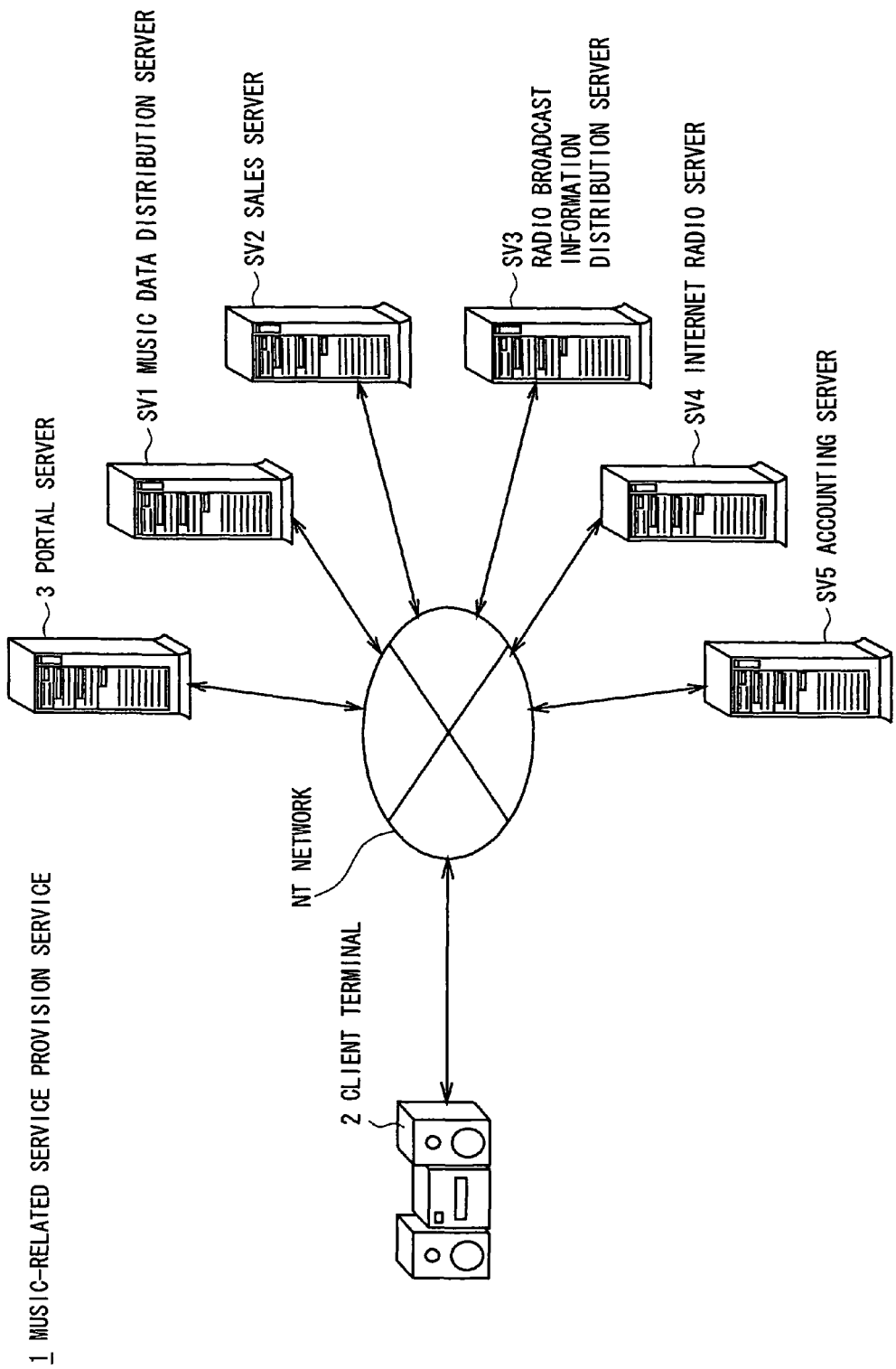
FIG. 1 is a schematic diagram showing an entire configuration of a music-related service provision system.

Preferred embodiments of this invention will be described in detail with reference to accompanying drawings.
(1) Music-Related Service Provision System
(1-1) System Configuration In FIG. 1, reference numeral 1 shows a music-related service provision system as a whole. This system 1 has a client terminal 2 of a user who has a contract with the provider of this music-related service provision system 1, a portal server 3 which manages the client terminal 2, and a plurality of servers SV1 to SV5 which provide various music-related services to the client terminal 2.

In this embodiment, the music data distribution server SV1 provides a music data distribution service which distributes to the client terminal 2 music data in a format such as ATRAC3 (Adaptive Transform Acoustic Coding 3), ACC (Advanced Audio Coding), WMA (Windows (trademark) Media Audio), RealAUDIO G2 Music Codec, or MP3 (MPEG AUDIO Layer-3).

The sales server SV2 provides a sales service for selling CDs (Compact Discs), DVDs (Digital Versatile Discs) and the like, to the user via the client terminal 2.

The radio broadcast information distribution server SV3 provides a radio broadcast information distribution service for distributing to the client terminal 2 radio broadcast information on radio programs, songs, etc., of radio broadcasts which are broadcasted from a radio station.

The Internet radio server SV4 provides an Internet radio broadcasting service for broadcasting radio broadcast data via a network NT which is equivalent to the Internet, to the client terminal 2 in a streaming distribution system.

In addition to this, the accounting server SV5 executes an accounting process for charging users for various costs in response to requests from the portal server 3 or the like.
(1-2) Configuration of Client Terminal 2
(1-2-1) Functional Circuit Block Configuration of Client Terminal 2

Figure 2:
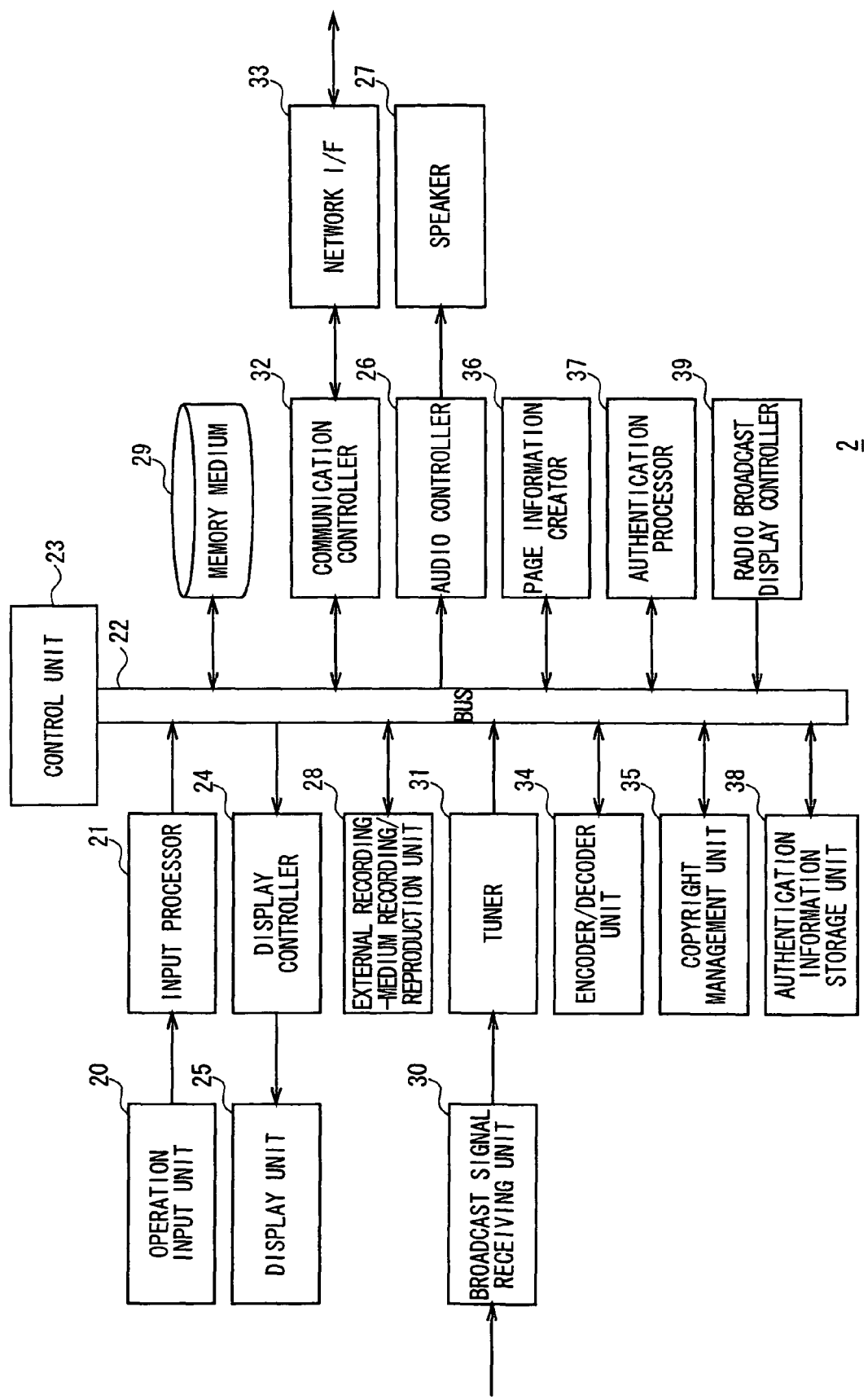
FIG. 2 is a block diagram showing a configuration of a client terminal by using functional circuit blocks.

The hardware configuration of the client terminal 2 will be now described by using functional circuit blocks. Referring to FIG. 2, in the client terminal 2, when the user operates an operation input unit 20 including various operation buttons which are provided on the client terminal case or a remote controller (not shown), the operation input unit 20 senses the operation and gives an operation input signal in response to the operation to an input processor 21.

The input processor 21 converts the operation input signal, which is received from the operation input unit 20, into a prescribed operation command and gives it to a control unit 23 via a bus 22.

The control unit 23 controls the operation of each circuit based on operation commands and control signals which are received from the circuits being connected via the bus 22.

A display controller 24 performs digital-to-analog conversion on video data received via the bus 22, and gives the resultant analog video signal to a display unit 25.

The display unit 25 is a display device such as a liquid crystal display, and may be directly or externally attached to this terminal case.

When receiving as an analog video signal a processing result of the control unit 23 or various video data via the display controller 24, the display unit 25 displays video based on the analog video signal.

An audio controller 26 performs digital-to-analog conversion on audio data received via the bus 22, and gives the resultant analog audio signal to a speaker 27. The speaker 27 outputs sound based on the analog audio signal given from the audio controller 26.

An external recording-medium recording/reproduction unit 28 is a recording/reproduction unit which plays content data from a CD or plays content data from an external recording medium such as a memory stick (trademark) having a flash memory in an outer package and which records target content data in such an external recording medium.

When the external recording-medium recording/reproduction unit 28 reads video data from an external recording medium as content data, it gives the read video data to the display controller 24 via the bus 22.

Then the display controller 24 converts the video data, which the external recording-medium recording/reproduction unit 28 read from the external recording medium as the content data, into an analog video signal and gives it to the display unit 25.

In addition, when the external recording-medium recording/reproduction unit 28 reads audio data from the external recording medium as content data, it gives the read audio data to the audio controller 26 via the bus 22.

The audio controller 26 converts the audio data, which the external recording-medium recording/reproduction unit 28 read from the external recording medium as the content data, into an analog audio signal and gives it to the speaker 27.

Further, the control unit 23 gives the content data, which the external recording-medium recording/reproduction unit 28 read from the external recording medium, to a memory medium 29 provided in the client terminal 2, via the bus 22, thereby storing the content data in the memory medium 29 (hereinafter, to store content data in the memory medium 29 is referred to as ripping).

Then, when the control unit 23 reads image data or video data as content data from the memory medium 29, it gives the read video data to the display controller 24 via the bus 22.

When the control unit 23 reads audio data as content data from the memory medium 29, it gives the read audio data to the audio controller 26 via the bus 22.

Furthermore, the control unit 23 reads and gives music data from the memory medium 29 to the external recording-medium recording/reproduction unit 28, so that the external recording-medium recording/reproduction unit 28 is capable of recording the music data in an external recording medium.

A broadcast signal receiving unit 30 receives a radio broadcast wave from each radio station and gives it to a tuner 31.

The tuner 31 extracts the radio broadcast signal of a broadcast frequency corresponding to a radio station that is specified via the operation input unit 20, out of the radio broadcast waves received from the broadcast signal receiving unit 30, performs a prescribed reception process on the extracted signal, and gives the resultant audio data to the audio controller 26 via the bus 22, under the control of the control unit 23.

The audio controller 26 converts the audio data, which is received from the tuner 31, into an analog audio signal which is then given to the speaker 27. Thereby the speaker 27 is capable of outputting the sound of the radio program currently broadcasted by the radio station, and thus the user can listen to the sound of the radio program.

Further, the control unit 23 gives and stores audio data obtained by the tuner 31, in the memory medium 29, to thereby record the sound of the radio program.

Furthermore, the control unit 23 accesses the portal server 3 and the other servers SV1 to SV4 on the network NT by connecting to the network NT via a communication controller 32 and a network interface 33 in order, to thereby communicate various kinds of information and various data with the portal server 3 and the other servers SV1 to SV4.

An encoder/decoder unit 34 decodes compression-encoded content data that is given from the network NT via the network interface 33 and the communication controller 32 in order or compression-encoded content data read from the memory medium 29 or an external recording medium, and gives the resultant to the display controller 24 and the audio controller 26.

In addition, the encoder/decoder unit 34 performs compression-encoding on raw data read from an external recording medium or audio data received from the tuner 31, and gives the compression-encoded content data to the memory medium 29.

Thereby the content data, which has been subjected to the compression-encoding by the encoder/decoder unit 34, is stored in the memory medium 29 under the control of the control unit 23.

A copyright management unit 35 creates copyright management information for content data downloaded from the network NT via the network interface 33 and the communication controller 32 in order or copyright management information for content data read from an external recording medium by the external recording-medium recording/reproduction unit 28.

The copyright management information created by the copyright management unit 35 is registered in the memory medium in association with the content data under the control of the control unit 23.

In addition, when content data with copyright management information is exported between the memory medium 29 and a prescribed external recording medium or when content data with copyright management information is imported between the prescribed external recording medium and the memory medium 29, the copyright management unit 35 appropriately updates the contents of the copyright management information corresponding to the content data to thereby protect the copyright of the content data.

A page information creator 36 interprets page information such as an XML (eXtensible Markup Language) file or an HTML (Hyper Text Markup Language) file, which is received from the network NT via the network interface 33 and the communication controller 32 in order, creates video data to be displayed on the display unit 25, and gives the created video data to the display controller 24.

An authentication processor 37 performs an authentication process, such as transmitting authentication information via the communication controller 32 and the network interface 33 in order, to the portal server 3 or another server SV1 to SV4 being connected via the network interface 33 over the network NT.

An authentication information storage unit 38 stores authentication information that is required when the authentication processor 37 accesses the portal server 3 or another server SV1 to SV4.

A radio broadcast display controller 39 transmits a request signal requesting radio broadcast information on a radio broadcast being listened to by the user, to the radio broadcast information distribution server SV3 corresponding to the radio station broadcasting the radio broadcast being listened to, via the communication controller 32 and the network interface 33 in order.

As a result, the radio broadcast display controller 39 receives the radio broadcast information via the network interface 33 and the communication controller 32 in order, from the radio broadcast information distribution server SV3 existing on the network NT, and gives the received radio broadcast information to the display controller 24 to thereby display on the display unit 25 the radio broadcast information including the title of the radio program being received, the title and artist name of a song playing.

(1-2-2) Directory Management

Figure 3:
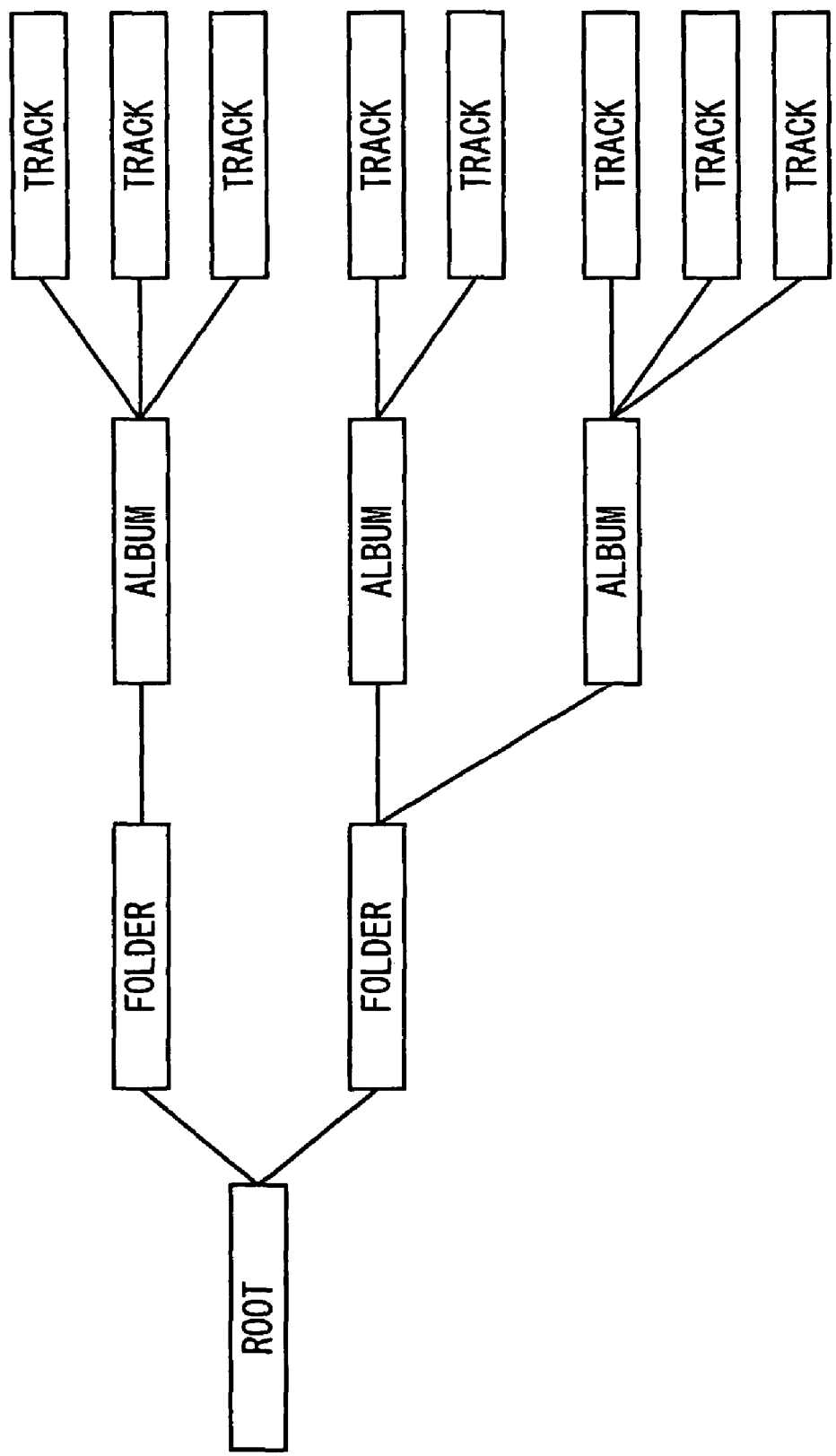
FIG. 3 is a schematic diagram showing a directory structure.

The control unit 23 of the client terminal 2 manages content data that is stored in the memory medium 29, in a directory structure shown in FIG. 3. As a lower layer of "root" directory, a prescribed number of "folder" directories, which is within a prescribed range of numbers, are created. The "folder" directories are created for the genres of content, or owner users, for example.

As a lower layer of the "folder" directories, a prescribed number of "album" directories, which is within a prescribed range of numbers, are created. The "album" directories each correspond to one album title, for example. As a lower layer of the "album" directories, one or more "track" files belonging to each "album" directory are stored, and each "track" file stores one song, i.e., content.

Content data is managed in such a directory structure by using database files being stored in the memory medium 29.

(1-3) Functional Circuit Block Configuration of Portal Server 3

Figure 4:
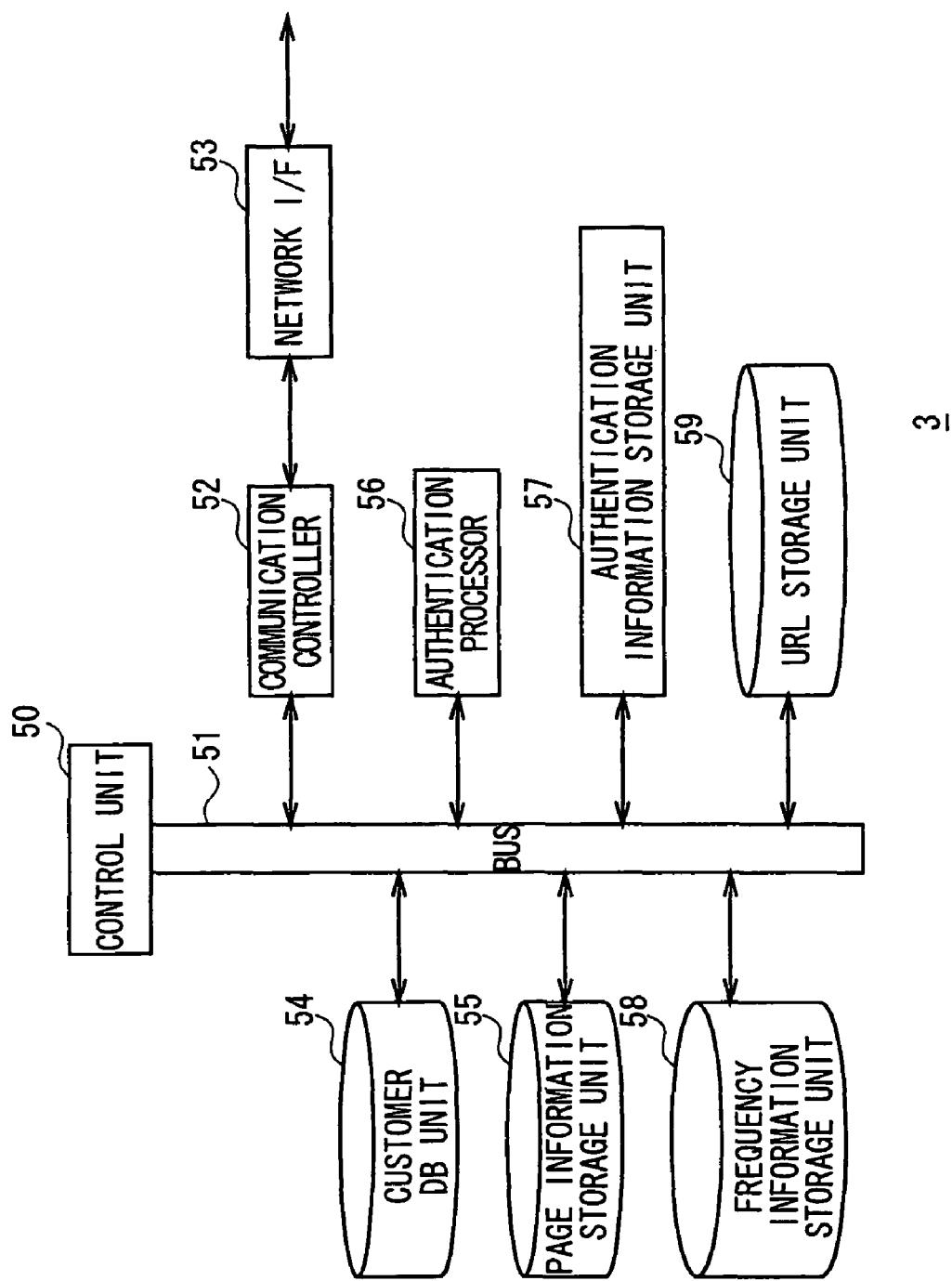
FIG. 4 is a block diagram showing a configuration of a portal server by using functional circuit blocks.

The hardware configuration of the portal serve 3 will be now described with reference to the functional circuit blocks of FIG. 4. A control unit 50 of the portal server 3 controls the operation of each circuit being connected via a bus 51.

A communication controller 52 communicates various kinds of information with the client terminal 2 and the other servers SV1 to SV5 via a network interface 53 under the control of the control unit 50.

A customer database unit 54 registers customer information including user ID (identification) information and password information of users who have contracts with the provider of the music-related service provision system 1 in association with each other.

A page information storage unit 55 stores page information which is managed by the provider of the music-related service provision system 1.

The page information is described in the XML language, for example, and includes URL (Uniform Resource Locator) information that is used for accessing the music data distribution server SV1, the sales server SV2, the radio broadcast information distribution server SV3, and the Internet radio server SV4.

When an authentication processor 56 receives user ID information and password information from the client terminal 2 via the network interface 53 and the communication controller 52 in order, the authentication processor 56 performs a user authentication process by confirming whether the received user ID information and password information are registered in the customer database unit 54 as customer information.

When the user authentication process is completed, the authentication processor 56 issues and temporarily stores portal authentication result information (authentication session ID information to be described later) showing the result of the user authentication process in an authentication information storage unit 57.

When the user authentication process of the authentication processor 56 results in confirming the user as a registered user, the control unit 50 transmits page information for subscribers being stored in the page information storage unit 55, together with the portal authentication result information to the client terminal 2 via the communication controller 52 and the network interface 53 in order.

In addition, the control unit 50 may be designed to, when the user authentication process of the authentication processor 56 results in confirming the user as an unregistered user, transmit authentication error information together with authentication failure notification page information indicating authentication failure being stored in the page information storage unit 55, to the client terminal 2 via the communication controller 52 and the network interface 53 in order.

In addition, when the authentication processor 56 receives portal authentication result information (an authentication ticket to be described later) which is obtained from the client terminal 2 of the user and is transmitted as a result of performing the authentication process on the user from the music data distribution server SV1, the sales server SV2, or the radio broadcast information distribution server SV3, via the network interface 53 and the communication control 52 in order, it compares the received portal authentication result information with portal authentication result information corresponding to the user which is temporarily stored in the authentication information storage unit 57.

Thereby the authentication processor 56 performs a confirmation process to confirm whether the portal authentication information received from the music data distribution server SV1, the sales server sales server SV2 or the radio broadcast information distribution server SV3 is rightful portal authentication result information, and returns confirmation result information indicating the confirmation result, to the music data distribution server SV1, the sales server SV2, or the radio broadcast information distribution server SV3 via the communication controller 52 and the network interface 53 in order.

A frequency information storage unit 58 stores area codes, such as postal codes, specifying areas, frequency information indicating the broadcast frequencies of the radio broadcasts receivable in the areas indicated by the area codes, the names of the radio stations (hereinafter, referred to as radio station names) broadcasting the radio broadcasts, and call signs that are identification information each unique to each radio station.

A URL storage unit 59 stores the call signs of the radio stations for radio broadcasting and URL information that can be used for obtaining radio broadcast information (hereinafter, referred to as Now On Air information) including the titles of the radio programs being broadcasted from the radio stations corresponding to the call signs and the titles of songs playing in the radio programs, in association with each other.

(1-4) Functional Circuit Block Configuration of Music Data Distribution Server SV1

Figure 5:
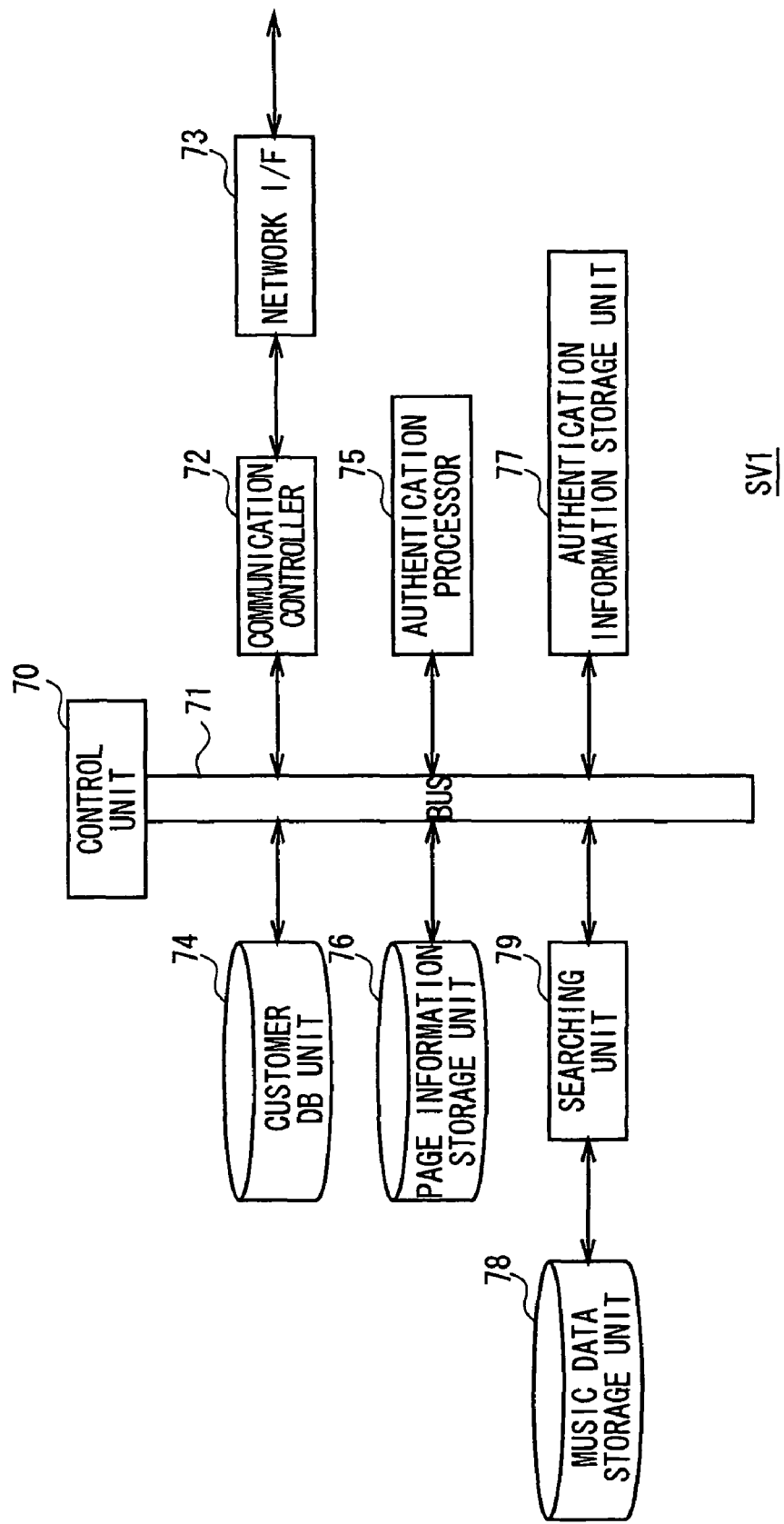
FIG. 5 is a block diagram showing a configuration of a music data distribution server by using functional circuit blocks.

The hardware configuration of the music data distribution server SV1 will be now described with reference to the functional circuit blocks of FIG. 5. A control unit 70 of the music data distribution server SV1 controls the operation of each circuit being connected via a bus 71.

A communication controller 72 communicates various kinds of information and various data such as content data with the client terminal 2 and the portal server 3 via a network interface 73 under the control of the control unit 70.

A customer database unit 74 registers customer information including the user ID information and password information of users who have contracts with the provider of the music data distribution server SV1 in association with each other. Note that, if an authentication processor 75 has a function to perform an authentication process on a user based on portal authentication result information which is issued from the portal server 3 and is given from the client terminal 2, the customer database unit 74 may not be provided.

A page information storage unit 76 stores page information for music data distribution, which introduces downloadable music data and is managed by the music data distribution server SV1.

Note that the page information for music data distribution is described in the XML language, for example, and allows the user using the client terminal 2 to select desired music data for download.

When the control unit 70 receives a page information acquisition request signal requesting page information for music data distribution, from the client terminal 2 via the network interface 73 and the communication controller 72 in order, it transmits the page information for music data distribution being stored in the page information storage unit 76 to the client terminal 2 via the communication controller 72 and the network interface 73 in order, in response to the received page information acquisition request signal.

When the authentication processor 75 receives the user ID information and password information of the user using the client terminal 2, from the client terminal 2 via the network interface 73 and the communication controller 72 in order, it performs a user authentication process by confirming whether the received user ID information and password information are registered in the customer database unit 74 as customer information.

In addition, as a user authentication technique different from the user authentication process using user ID information and password information, the authentication processor 75 receives portal authentication result information (authentication ticket to be described later), which is issued from the portal server 3 and is given from the client terminal 2, via the network interface 73 and the communication controller 72 in order, and transmits the received portal authentication result information to the portal server 3 via the communication controller 72 and the network interface 73 in order.

Then as a result of the transmission of the portal authentication result information to the portal server 3, the authentication processor 75 receives confirmation result information, which is returned as a result of an authentication process (that is, the above-described confirmation process) on the portal authentication result information, from the portal server 3 via the network interface 73 and the communication controller 72 in order, and confirms based on the received confirmation result information whether the user is a registered user who has a contract with the provider of the music-related service provision system 1.

When the user authentication process is completed in this way, the authentication processor 75 issues server authentication result information (service session ID information to be described later) showing a result of the user authentication process.

When the user authentication process of the authentication processor 75 results in confirming the user as a registered user, the control unit 70 transmits page information for music data distribution for subscribers being stored in the page information storage unit 76, together with the server authentication result information to the client terminal 2 via the communication controller 72 and the network interface 73 in order.

When the user authentication process of the authentication processor 75 results in confirming the user as an unregistered user, the control unit 70 transmits authentication error information together with authentication failure notification page information showing authentication failure being stored in the page information storage unit 76 to the client terminal 2 via the communication controller 72 and the network interface 73 in order.

By the way, an authentication information storage unit 77 temporarily stores server authentication result information issued from the authentication processor 75, and also stores various kinds of authentication information that are required when the authentication processor 75 performs the user authentication process on the user using the client terminal 2.

A music data storage unit 78 stores a plurality of compression-encoded music data in the above-described ATRAC3 or MP3 format and search keys such as content ID information in association with each other.

When a searching unit 79 receives a download request signal which is sent from the client terminal 2 as a result of the transmission of the page information for music data distribution to the client terminal 2, via the network interface 73 and the communication unit 72 in order, it takes out a search key from the received download request signal, the download request signal including the search key for searching for music data to be downloaded and requesting download of the music data.

Then the searching unit 79 searches, based on the search key, the plurality of music data being stored in the music data storage unit 78 for the music data that is desired for download and meets the search conditions indicated by the search key.

The control unit 70 transmits the found music data, that is desired for download, to the client terminal 2 via the communication controller 72 and the network interface 73 in order.

In addition, the control unit 70 transmits accounting information for charging the user for download of the music data in the client terminal 2, to the accounting server SV5 via the communication controller 72 and the network interface 73 in order, so that the accounting server SV5 performs the accounting process to charge the user for the download of the music data.

(1-5) Functional Circuit Block Configuration of Sales Server SV2

Figure 6:
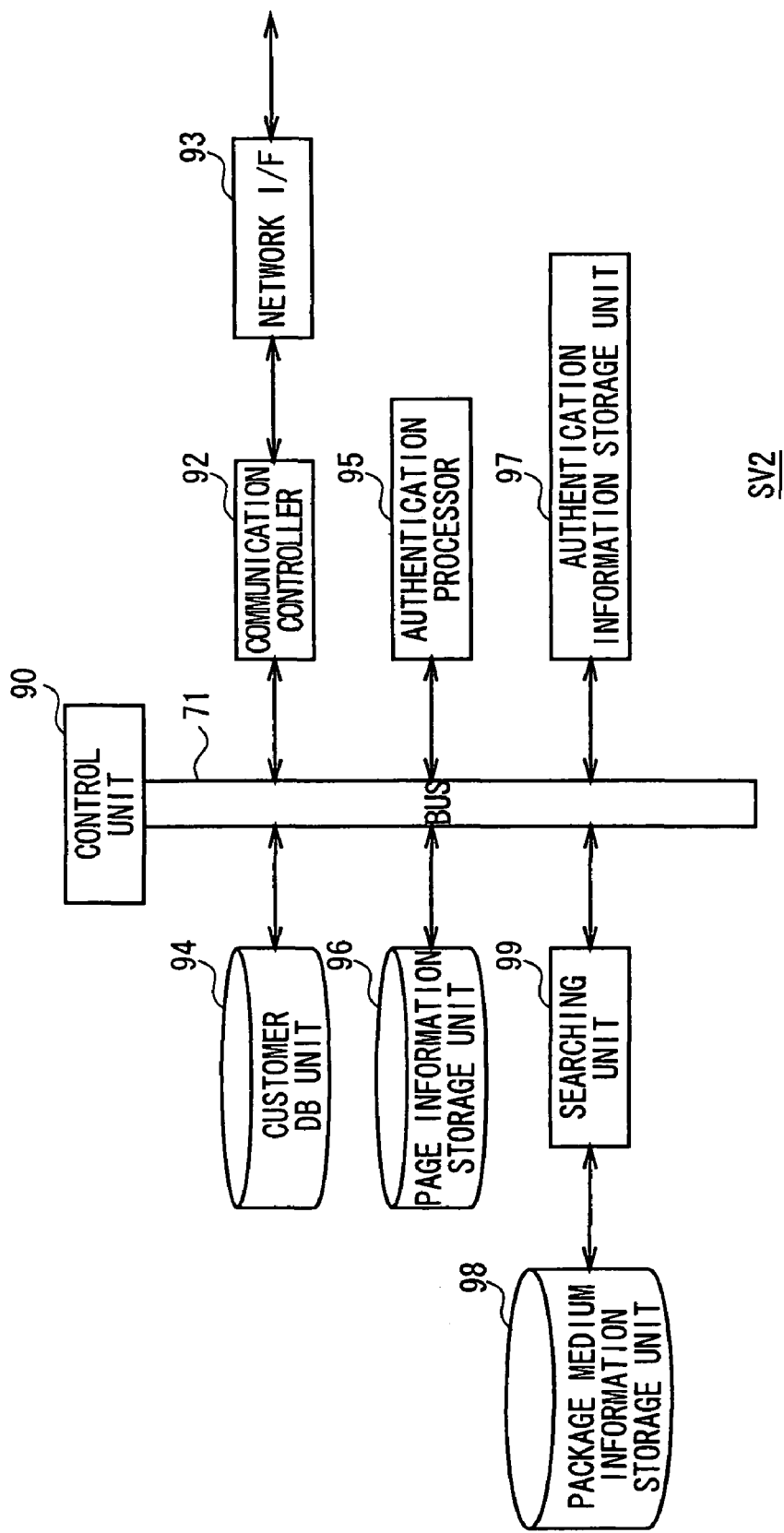
FIG. 6 is a block diagram showing a configuration of a sales server by using functional circuit blocks.

Next, the hardware configuration of the sales server SV2 will be described with reference to the functional circuit blocks of FIG. 6. A control unit 90 of the sales server SV2 controls the operation of each circuit being connected with a bus 91.

A communication controller 92 communicates various kinds of information with the client terminal 2 and the portal server 3 via a network interface 93 under the control of the control unit 90.

A customer database unit 94 registers customer information including the user ID information and password information of users who have contracts with the provider of the sales server SV2 in association with each other. In this connection, when an authentication processor 95 has a function to perform an authentication process on a user based on portal authentication result information which is issued from the portal server 3 and is given from the client terminal 2, the customer database unit 94 may not be not provided.

A page information storage unit 96 stores page information for package media sales which introduces package media, such as CDs and DVDs on sale, and is managed by the sales server SV2.

In this connection, the page information for package media sales is described in the XML language or the like, and allows the user using the client terminal 2 to select package media such as CDs and DVDs for purchase.

When the control unit 90 receives a page information acquisition request signal requesting page information for package media sales, from the client terminal 2 via the network interface 93 and the communication controller 92 in order, it transmits the page information for package media sales being stored in the page information storage unit 96, to the client terminal 2 via the communication controller 92 and the network interface 93 in order.

When the authentication processor 95 receives the user ID information and password information of the user using the client terminal 2, from the client terminal 2 via the network interface 93 and the communication controller 92 in order, it performs a user authentication process by confirming whether the received user ID information and password information are registered in the customer database unit 94 as customer information.

In addition, as a user authentication technique different from the user authentication process using user ID information and password information, the authentication processor 95 receives portal authentication result information (authentication ticket to be described later) which is issued from the portal server 3 and is given from the client terminal 2, via the network interface 93 and the communication controller 92 in order, and transmits the received portal authentication result information to the portal server 3 via the communication controller 92 and the network interface 93 in order.

Then the authentication processor 95 receives confirmation result information, which is returned from the portal server 3 as a result that the portal server 3 performs the confirmation process on the portal authentication result information in response to the transmission of the portal authentication result to the portal server 3, via the network interface 93 and the communication controller 92 in order, and confirms based on the received confirmation result information whether the user is a registered user who have a contract with the provider of the music-related service provision system 1.

When the user authentication process is completed in this way, the authentication processor 95 issues server authentication result information (service session ID information to be described later) showing the result of the user authentication process.

At this time, when the user authentication process of the authentication processor 95 results in confirming the user as a registered user, the control unit 90 transmits the page information for package media sales for subscribers being stored in the page information storage unit 96, together with the server authentication result information to the client terminal 2 via the communication controller 92 and the network interface 93 in order.

When the user authentication process of the authentication processor 95 results in confirming the user as an unregistered user, on the other hand, the control unit 90 transmits authentication error information together with authentication failure notification page information indicating authentication failure being stored in the page information storage unit 96, to the client terminal 2 via the communication controller 92 and the network interface 93 in order.

By the way, an authentication information storage unit 97 temporarily stores server authentication result information which is issued from the authentication processor 95 and also stores various kinds of authentication information that are required when the authentication processor 95 performs the user authentication process on the user using the client terminal 2.

A package medium information storage unit 98 stores information on a plurality of package media such as CDs and DVDs on sale (hereinafter, referred to as package medium information) and search keys such as package media ID information in association with each other.

When a searching unit 99 receives a medium information request signal requesting package medium information on a prescribed package medium such as a CD or a DVD which is transmitted from the client terminal 2 as a result of the transmission of the page information for package media sales to the client terminal 2, via the network interface 93 and the communication controller 92 in order, it takes a search key for searching for the specified package medium out of the received medium information request signal.

Then based on the search key, the searching unit 99 searches the plurality of package medium information being stored in the package medium information storage unit 98 for package medium information on the specified package medium meeting the search conditions indicated by the search key.

The control unit 90 transmits the found package medium information to the client terminal 2 via the communication controller 92 and the network interface 93 in order, thereby showing the user the package medium information on the specified package medium.

As a result, when the control unit 90 receives a purchase request signal requesting purchase of the prescribed package medium, from the client terminal 2 via the network interface 93 and the communication controller 92 in order, it performs a sales process such as giving the specified package medium to the user using the client terminal 2.

In addition, the control unit 90 transmits accounting information for an accounting process of charging the user for the purchase of the specified package medium, to the accounting server SV5 via the communication controller 92 and the network interface 93 in order, and thereby the accounting server SV5 performs the accounting process according to the user purchase of the specified package medium.

When the accounting server SV5 completes the accounting process for the user, the control unit 90 transmits purchase completion page information showing that the purchase process of the package medium has been completed, to the client terminal 2 via the communication controller 92 and the network interface 93 in order.

(1-6) Functional Circuit Block Configuration of Radio Broadcast Information Distribution Server SV3

Figure 7:
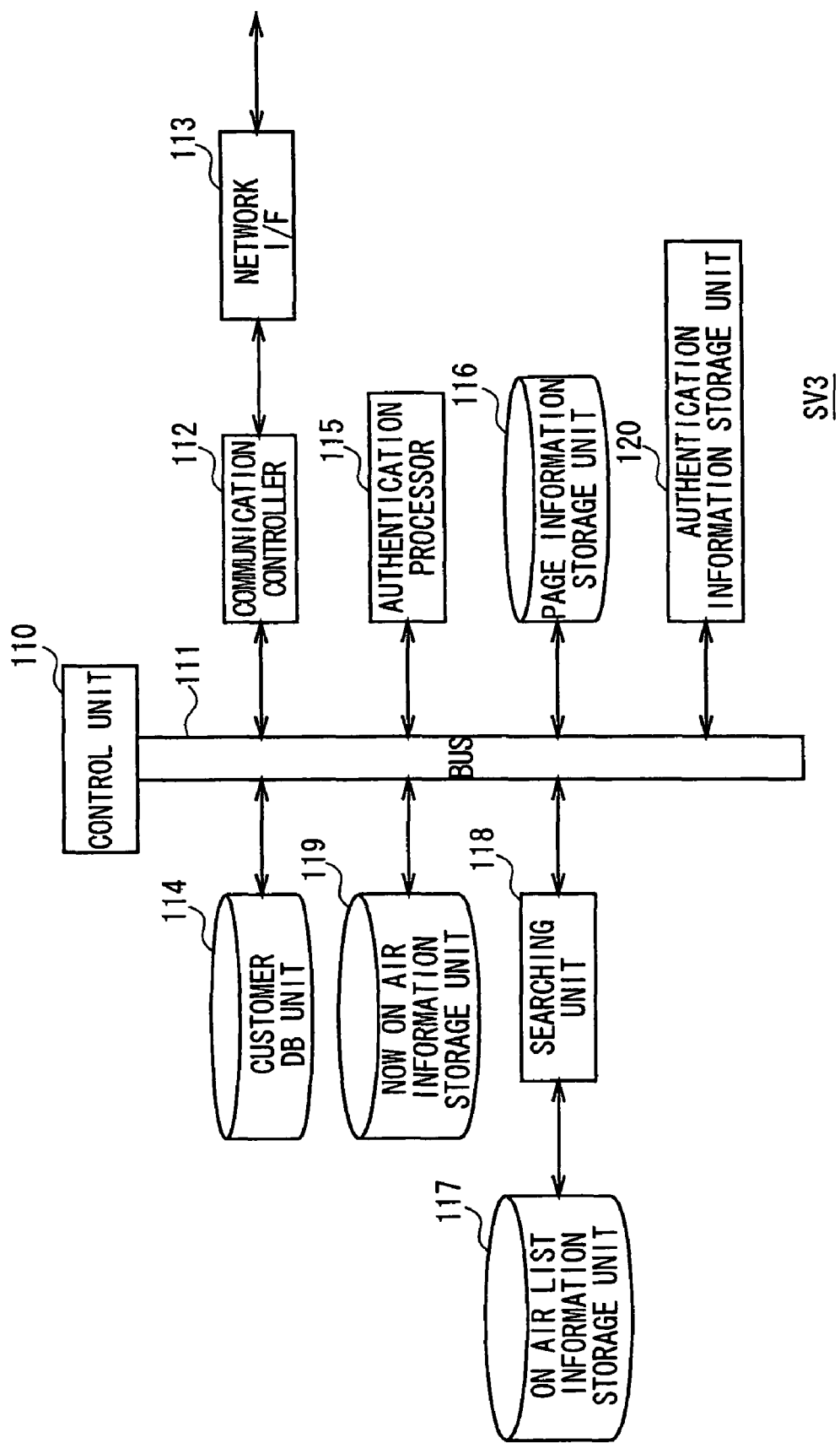
FIG. 7 is a block diagram showing a configuration of a radio broadcast information distribution server by using functional circuit blocks.

Next, the hardware configuration of the radio broadcast information distribution server SV3 will be described with reference to the functional circuit blocks of FIG. 7. A control unit 110 of the radio broadcast information distribution server SV3 controls the operation of each circuit being connected with a bus 111.

A communication controller 112 communicates various kinds of information with the client terminal 2 and the portal server 3 via a network interface 113 under the control of the control unit 110.

A customer database unit 114 registers customer information including the user ID information and password information of users who have a contract with the provider of the radio broadcast information distribution server SV3 in association with each other. In this connection, when an authentication processor 115 has a function to perform a user authentication process based on portal authentication result information which is issued from the portal server 3 and is given from the client terminal 2, the customer database unit 114 may not be provided.

A page information storage unit 116 stores page information for On Air list information distribution, which is managed by the radio broadcast information distribution server SV3 and is used for obtaining radio broadcast information (hereinafter, referred to as On Air list information or On Air information) on radio programs that were already broadcasted by the radio station corresponding to the radio broadcast information distribution server SV3.

In this connection, the page information for On Air list information distribution is described in the XML language, and has an input box or the like, for letting the user using the client terminal 2 enter the broadcasting time information or program title of a radio program as a search key for searching for On Air information to be obtained.

An On Air list information storage unit 117 stores On Air list information which lists the titles, broadcasting start times and end times of the radio programs that were already broadcasted by the radio station corresponding to the radio broadcast information distribution server SV3, and the titles, artist names, and broadcasting start times of the songs that played in the radio programs.

When the control unit 110 receives a page information acquisition request signal requesting page information for On Air list information distribution, from the client terminal 2 via the network interface 113 and the communication controller 112 in order, it transmits the page information for On Air list information distribution being stored in the page information storage unit 116, to the client terminal 2 via the communication controller 112 and the network interface 113 in order.

As a result, the client terminal 2 transmits an On Air list information request signal that includes a search key for searching for desired On Air list information entered on the page information for On Air list distribution and requests download of On Air list information, and thereby the searching unit 118 receives the On Air list information request signal via the network interface 113 and the communication controller 112 in order, and takes the search key out of the received On Air list information request signal.

Then based on the search key, a searching unit 118 searches the entire On Air list information being stored in the On Air list information storage unit 117 for a part meeting the search conditions indicated by the search key as On Air list information to be obtained.

Then the control unit 110 transmits the found On Air list information to the client terminal 2 via the communication controller 112 and the network interface 113 in order.

In addition, a Now On Air information storage unit 119 stores Now On Air information including the title, broadcasting start time and end time of the radio program currently broadcasted from the radio station corresponding to the radio broadcast information distribution server SV3, and the title, artist name, and broadcasting start time of a song currently playing in the radio program.

When the authentication processor 115 receives the user ID information and password information of the user using the client terminal 2, which is transmitted together with the Now On Air information request signal requesting Now On Air information, from the client terminal 2 via the network interface 113 and the communication controller 112 in order, it performs a user authentication process by confirming whether the received user ID information and password information are registered in the customer database unit 114 as customer information.

In addition, as a user authentication process different from the user authentication process using user ID information and password information, the authentication processor 115 receives portal authentication result information (authentication ticket to be described later) which is issued from the portal server 3 and is given from the client terminal 2, via the network interface 113 and the communication controller 112, and transmits the received portal authentication result information to the portal server 3 via the communication controller 112 and the network interface 113.

The portal server 3 performs the authentication process (that is, the above-described confirmation process) on the portal authentication result information when receiving the portal authentication result information, and returns confirmation result information. The authentication processor 115 receives the confirmation result information via the network interface 113 and the communication controller 112 in order, and confirms based on the received confirmation result information whether the user is a registered user who has a contract with the provider of the music-related service provision system 1.

When the user authentication process is completed, the authentication processor 115 issues server authentication result information (service session ID information) showing a result of the user authentication process.

When the user authentication process of the authentication processor 115 results in confirming the user as a registered user, the control unit 110 transmits the Now On Air information being stored in the Now On Air information storage unit 119 together with server authentication result information to the client terminal 2 via the communication controller 112 and the network interface 113.

On the other hand, the user authentication process of the authentication processor 115 results in confirming the user as an unregistered user, the control unit 110 transmits authentication error information together with authentication failure notification page information indicating authentication failure being stored in the page information storage unit 116 to the client terminal 2 via the communication controller 112 and the network interface 113 in order.

When the user sends a request for Now On Air information and the user is confirmed as a registered user, the control unit 110 transmits the Now On Air information. When the user is not confirmed as a registered user, the control unit 110 does not allow the user to use the radio broadcast information distribution service which is provided by the radio broadcast information distribution server SV3, such as Now On Air information distribution service.

By the way, an authentication information storage unit 120 temporarily stores server authentication result information issued from the authentication processor 115 and also stores various kinds of authentication information that are required when the authentication, processor 115 performs the user authentication process on the user using the client terminal 2.

(1-7) Outline of Processing of Each Server

Next the outlines of processes to be executed between the client terminal 2 and the portal server 3, and processes to be executed between the client terminal 2 and each of the music data distribution server SV1, the sales server SV2 and the radio broadcast information distribution server SV3 will be described with reference to the sequence charts of FIG. 8 to FIG. 13.

(1-7-1) User Authentication Process Between Client Terminal 2 and Portal Server 3

First the user authentication process between the client terminal 2 and the portal server 3 will be described.

In the client terminal 2 of the user having a contract with the provider of the music-related service provision system 1, the control unit 23 starts the authentication request process when the client terminal 2 is powered on or when the user presses a prescribed operation button of the operation input unit 20, and the input processor 21 converts an operation input signal sensed by the operation input unit 20 into an operation command.

The client terminal 2 starts the authentication request process, and the control unit 23 creates a connection request signal including authentication session ID information, which is temporarily stored in the authentication information storage unit 38, and transmits the created connection request signal to the portal server 3 via the communication controller 32 and the network interface 33 in order at step SP1.

In this connection, the authentication session ID information is identification information that is issued from the portal server 3 for identification of each connection status of communication (that is, session) every time when the client terminal 2 and portal server 3 starts communication connection for performing various processes including the user authentication process.

Note that the authentication ID information has a prescribed valid period (for example, about one minute) that is counted from the time of issuance from the portal server 3, for use in the user authentication process or the like.

Therefore, if the client terminal 2 receiving the authentication session ID information from the portal server 3 cannot show the authentication session ID information to the portal server 3 within the valid period, the portal server 3 recognizes that the communication connection specified by the authentication session ID information has been disconnected.

This means that the portal server 3 is capable of preventing authentication session ID information issued in the past from being falsely used by unregistered users who do not have a contract with the provider of the music-related service provision system 1 in the user authentication process.

In addition, authentication session ID information being temporarily stored in the authentication information storage unit 38 is the one that was issued from the portal server 3 when the client terminal 2 and the portal server 3 started the communication connection for performing the user authentication process or the like in the past.

When the client terminal 2 transmits a connection request signal, the control unit 50 of the portal server 3 receives the connection request signal via the network interface 53 and the communication controller 52 in order, and gives the authentication session ID information included in the received connection request signal to the authentication processor 56 at step SP2.

Then the authentication processor 56 performs the user authentication process based on the authentication session ID information received as the connection request signal from the client terminal 2, under the control of the control unit 50.

As a result, when the authentication processor 56 cannot confirm the user using the client terminal 2 as a registered user, due to expiry of the valid period of the authentication session ID information received from the client terminal 2, the control unit 50 transmits authentication error information showing authentication error to the client terminal 2 via the communication controller 52 and the network interface 53 in order.

At step SP3, when the control unit 23 of the client terminal 2 receives the authentication error information from the portal server 3 via the network interface 33 and the communication controller 32 in order, it reads the user ID information and password information being stored in the authentication information storage unit 38, and transmits the read user ID information and password information to the portal server 3 via the communication controller 32 and the network interface 33 in order.

At step SP4, the control unit 50 of the portal server 3 receives the user ID information and the password information from the client terminal 2 via the network interface 53 and the communication controller 52 in order, and gives the received user information and password information to the authentication processor 56.

The authentication processor 56 performs the user authentication process by confirming whether the user ID information and password information received from the client terminal 2 are included in the customer information being registered in the customer database unit 54, under the control of the control unit 50.

As a result, when the authentication processor 56 confirms the user using the client terminal 2 as a registered user, the authentication processor 56 issues authentication session ID information for the current connection status of communication between the client terminal 2 and the portal server 3, as portal authentication result information, and also temporarily stores the authentication session ID information which is issued for the client terminal 2, in the authentication information storage unit 57, under the control of the control unit 50.

Then the control unit 50 transmits the authentication session ID information, which is issued from the authentication processor 56 for the client terminal 2, to the client terminal 2 via the communication controller 52 and the network interface 53 in order.

At step SP5, the control unit 23 of the client terminal 2 receives the authentication session ID information from the portal server 3 via the network interface 33 and the communication controller 32 in order, and gives the received authentication ID information to the authentication processor 37.

The authentication processor 37 temporarily stores the authentication session ID information received from the portal server 3, in the authentication information storage unit 38 under the control of the control unit 23.

Thereby the control unit 23 can transmit a page information acquisition request signal requesting the portal server 3 for acquiring page information, together with the authentication session ID information, which was received from the portal server 3 and is temporarily stored in the authentication information storage unit 38, to the portal server 3 via the communication controller 32 and the network interface 33 in order.

At step SP6, the control unit 50 of the portal server 3 receives the page information acquisition request signal and the authentication session ID information from the client terminal 2 via the network interface 53 and the communication controller 52 in order, and gives the received authentication session ID information to the authentication processor 56.

The authentication processor 56 performs the user authentication process by comparing the authentication session ID information received from the client terminal 2 with the authentication session ID information which was issued for the client terminal 2 and is temporarily stored in the authentication information storage unit 57 at step SP4, under the control of the control unit 50.

As a result, at step SP7, when the authentication processor 56 confirms the user using the client terminal 2 as a registered user, it determines that the page information acquisition information from the client terminal 2 is a rightful request, and extends the valid period of the authentication session ID information issued for the client terminal 2.

The control unit 50 reads the page information requested by the user, from the page information storage unit 55, and transmits the read page information together with the authentication session ID information with valid period extended by the authentication processor 56, to the client terminal 2 via the communication controller 52 and the network interface 53 in order.

At step SP8, the control unit 23 of the client terminal 2 receives the page information and the authentication session ID information with extended valid period from the portal server 3 via the network interface 33 and the communication controller 32 in order, and gives the received page information to the page information creator 36 and also gives the authentication session ID information with extended valid period to the authentication processor 37.

The page information creator 36 creates video data of a page having links to the music data distribution server SV1, the sales server SV2, and the radio broadcast information distribution server SV3, based on the page information received from the control unit 23, and gives the created video data to the display controller 24.

The display controller 24 performs the digital-to-analog conversion on the video data received from page information creator 36, gives the resultant analog video signal to the display unit 25, and thereby the display unit 25 displays the page of the portal server 3 as video based on the analog video signal.

In addition, the authentication processor 37 temporarily stores the authentication session ID information with extended valid period received from the portal server 3 in the authentication information storage unit 38 by replacing the previous authentication session ID information, under the control of the control unit 23, thereby updating the authentication session ID information temporarily stored at above-described step SP5 to the authentication session ID information with extended valid period.

(1-7-2) User Authentication Process Between Client Terminal 2 and Each of Servers SV1 to SV3

Next the user authentication process to be conducted between the client terminal 2 and each of the music data distribution server SV1, the sales server SV2 and the radio broadcast information distribution server SV3 will be described with reference to FIG. 9.

Figure 8:
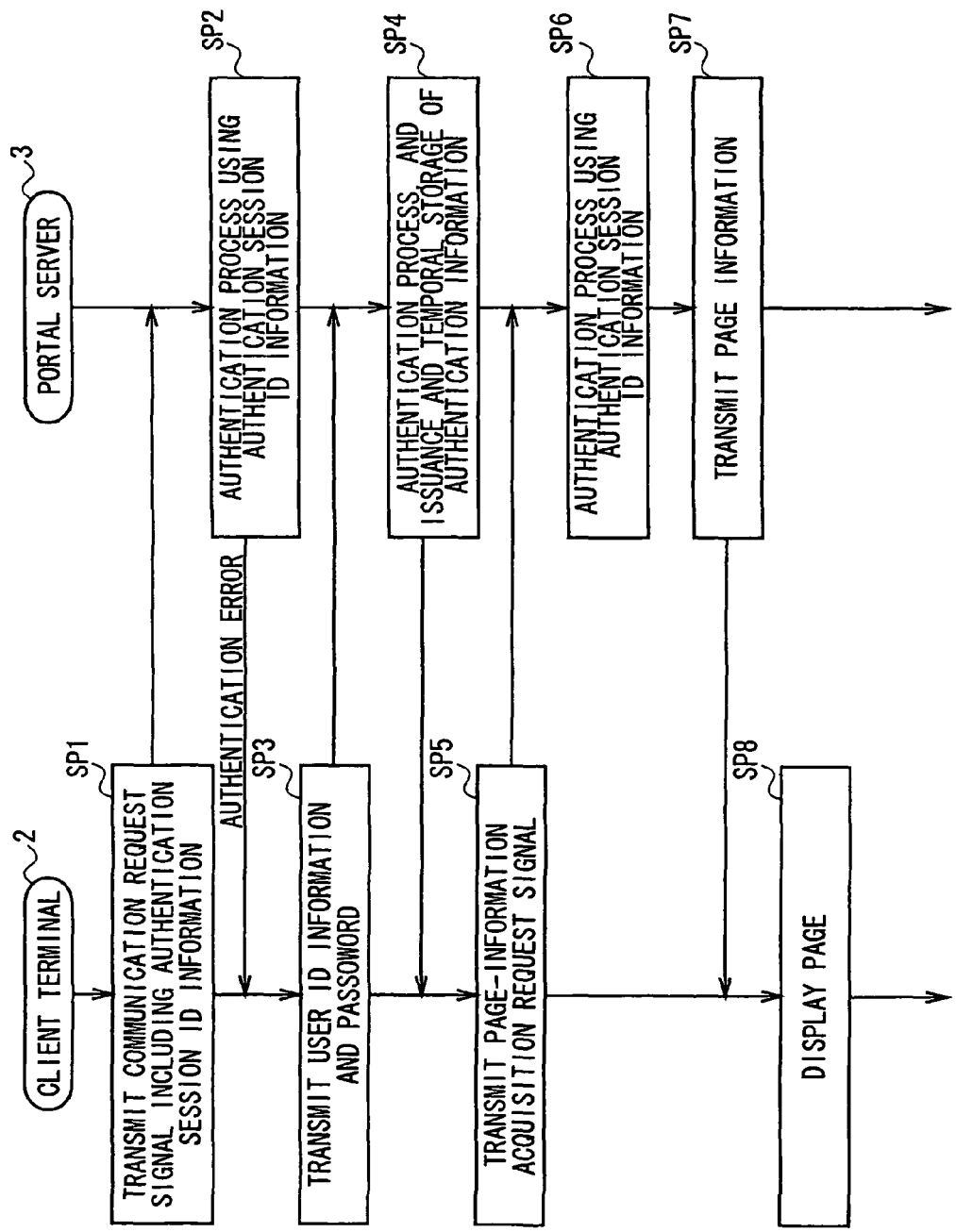
FIG. 8 is a sequence chart showing a user authentication that is conducted between the client terminal and the portal server.

In this case, the user authentication processes may be a user authentication process (hereinafter, referred to as indirect access authentication process) that is performed when the client terminal 2 obtains page information from the portal server 3 once as described in FIG. 8, and accesses the music data distribution server SV1, the sales server SV2, or the radio broadcast information distribution server SV3 by using a link included in the page information.

Another user authentication process is a user authentication process (hereinafter, referred to as direct access authentication process) that is performed when the client terminal 2 directly accesses the music data distribution server SV1, the sales server SV2, or the radio broadcast information distribution server SV3 by using URL information previously registered as a bookmark, without obtaining page information from the portal server 3.

It should be noted that the indirect access authentication process can be conducted in the same way for any combination of the client terminal 2, and the music data distribution server SV1, the sales server SV2, and the radio broadcast information distribution server SV3.

Further, the direct access authentication process can be also conducted in the same way for any combination of the client terminal 2, and the music data distribution server SV1, the sales server SV2, and the radio broadcast information distribution server SV3.

The indirect access authentication process and the direct access authentication process are different only in a step where the client terminal 2 obtains URL information to access the music data distribution server SV1, the sales server SV2 or the radio broadcast information distribution server SV3, and have the same steps after the URL information is obtained.

Therefore, for simple explanation, it is assumed that the client terminal 2 accesses the music data distribution server SV1, and the indirect access authentication process and the direct access authentication process are referred to as a user authentication process collectively.

At step SP10, the control unit 23 of the client terminal 2 transmits service session ID information read from the authentication information storage unit 38 together with a page information acquisition request signal requesting page information for music data distribution (page information for package media sales for the sales server SV2 or page information for On Air list information distribution for the radio broadcast information distribution server SV3), according to the URL information included as a link in the page information or the URL information registered as a bookmark, to the music data distribution server SV1 via the communication controller 32 and the network interface 33 in order.

In this connection, the service session ID information is identification information which is issued from the music data distribution server SV1, the sales server SV2 or the radio broadcast information distribution server SV3 accessed by the client terminal 2 for identifying a connection status of communication (that is, session) every time when the client terminal 2 and the music data distribution server SV1, the sales server SV2, or the radio broadcast information distribution server SV3 starts communication connection for performing various processes including the user authentication process.

In this connection, similarly to the above-described authentication session ID information, the service session ID information has a prescribed valid period (for example, one minute) that is counted from the time of issuance from the music data-distribution server SV1, the sales server SV2, or the radio broadcast information distribution server SV3, for use in the user authentication process or the like.

Therefore, if the client terminal 2 receiving service session ID information from a server SV1 to SV3 cannot show the service session ID information to the issuing music data distribution server SV1, sales server SV2 or radio broadcast information distribution server SV3 within the valid period, the issuing music data distribution server SV1, sales server SV2, or radio broadcast information distribution server SV3 determines that the communication connection status identified by the service session ID information has been disconnected.

This means that the music data distribution server SV1, the sales server SV2 and the radio broadcast information distribution server SV3 can prevent service session ID information issued in the past from being falsely used in the user authentication process or the like by users who do not have a contract with the provider of the music-related service provision system 1.

In addition, service session ID information being temporarily stored in the authentication information storage unit 38 is the one which was issued from the music data distribution server SV1, the sales server SV2 or the radio broadcast information distribution server SV3 when the client terminal 2 and the music data distribution server SV1, the sales server SV2 or the radio broadcast information distribution server SV3 started communication connection for performing the user authentication process or the like in the past.

At step SP11, the control unit 70 of the music data distribution server SV1 receives the page information acquisition request signal and the service session ID information from the client terminal 2 via the network interface 73 and the communication controller 72 in order, and gives the received service session ID information to the authentication processor 75.

The authentication processor 75 performs the user authentication process by comparing the service session ID information received from the client terminal 2 with the service session ID information being temporarily stored in the authentication information storage unit 77, under the control of the control unit 70.

When the authentication processor 75 cannot confirm the user using the client terminal 2 as a registered user, due to expiry of the valid period of the service session ID information received from the client terminal 2, for example, it determines that the acquisition request for page information for music data distribution from the client terminal 2 is not a rightful request.

Then when the authentication processor 75 does not confirm the user using the client terminal 2 as a registered user, the control unit 70 transmits authentication error information indicating authentication error and a shop code identifying the music data distribution server SV1 to the client terminal 2 via the communication controller 72 and the network interface 73 in order.

At step S12, the control unit 23 of the client terminal 2 receives the authentication error information and the shop code from the music data distribution server SV1 via the network interface 33 and the communication controller 32 in order, recognizes based on the received authentication error information that the music data distribution server SV1 did not confirm the user as a registered user and temporarily stores the shop code received from the music data distribution server SV1 in the authentication information storage unit 38.

Then the control unit 23 creates an authentication ticket issuance request signal requesting the portal server 3 for issuing an authentication ticket for accessing the music data distribution server SV1, and transmits the created authentication ticket issuance request signal together with the shop code of the music data distribution server SV1 and the authentication session ID information which was received from the portal server 3 and is temporarily stored in the authentication information storage unit 38, to the portal server 3 via the communication controller 32 and the network interface 33 in order.

At step SP13, the control unit 50 of the portal server 3 receives the authentication ticket issuance request signal, the shop code and the authentication session ID information from the client terminal 2 via the network interface 53 and the communication controller 52 in order, and gives these to the authentication processor 56.

The authentication processor 56 performs the user authentication process by comparing the authentication session ID information received from the client terminal 2 with the authentication session ID information being temporarily stored in the authentication information storage unit 57, under the control of the control unit 50.

When the authentication processor 56 cannot confirm the user using the client terminal 2 as a registered user, due to expiry of the valid period of the authentication session ID information received from the client terminal 2, it determines that the authentication ticket issuance request from the client terminal 2 is not a rightful request.

Then when the authentication processor 56 does not confirm the user using the client terminal 2 as a registered user, the control unit 50 transmits authentication error information indicating an authentication error to the client terminal 2 via the communication controller 52 and the network interface 53 in order.

When the authentication processor 56 confirms the user using the client terminal 2 as a registered user since the valid period of the authentication session ID information received from the client terminal 2 is not expired, on the contrary, it is determined that the authentication ticket issuance request from the client terminal 2 is a rightful request.

Then when the authentication processor 56 confirms the user using the client terminal 2 as a registered user, the control unit 50 goes on to step SP18.

At step SP14, the control unit 23 of the client terminal 2 receives the authentication error information from the portal server 3 via the network interface 33 and the communication controller 32 in order, it reads the user ID information and the password information being stored in the authentication information storage unit 38, and transmits the read user ID information and password information to the portal server 3 via the communication controller 32 and the network interface 33 in order.

At step SP15, the control unit 50 of the portal server 3 receives the user ID information and the password information from the client terminal 2 via the network interface 53 and communication controller 52 in order, and gives the received user ID information and password information to the authentication processor 56.

The authentication processor 56 performs the user authentication process by confirming whether the user ID information and the password information received from the client terminal 2 are included in the customer information being registered in the customer database unit 54, under the control of the control unit 50.

When the authentication processor 56 confirms the user using the client terminal 2 as a registered user, it issues authentication session ID information for the current connection status of communication between the client terminal 2 and the portal server 3 as portal authentication result information, and temporarily stores the authentication session ID information, which was issued for the client terminal 2, in the authentication information storage unit 57, under the control of the control unit 50.

Then the control unit 50 transmits the authentication session ID information, which has been issued from the authentication processor 56 for the client terminal 2, to the client terminal 2 via the communication controller 52 and the network interface 53 in order.

At step SP16, the control unit 23 of the client terminal 2 receives the authentication ID information from the portal server 3 via the network interface 33 and the communication controller 32 in order, and temporarily stores the received authentication session ID information in the authentication information storage unit 38 with the authentication processor 37.

Then the control unit 23 creates an authentication ticket issuance request signal requesting the portal server 3 for issuing an authentication ticket, and transmits the created authentication ticket issuance request signal together with the shop code being temporarily stored in the authentication information storage unit 38 and the authentication session ID information temporarily stored at this time, to the portal server 3 via the communication controller 32 and the network interface 33 in order.

In this embodiment, in the client terminal 2, the shop code is temporarily stored in the authentication information storage unit 38. Alternatively, by communicating a shop code when the client terminal 2 and the portal server 3 perform the processes of step SP12 to step SP16, the shop code can be transmitted to the portal server 3 at step SP16, without temporarily storing the shop code in the authentication information storage unit 38 of the client terminal 2.

At step SP17, the control unit 50 of the portal server 3 receives the authentication ticket issuance request signal, the shop code, and the authentication session ID information from the client terminal 2 via the network interface 53 and the communication controller 52 in order, and transmits them to the authentication processor 56.

The authentication processor 56 performs the user authentication process by comparing the authentication session ID information received from the client terminal 2 with the authentication session ID information being temporarily stored in the authentication information storage unit 57, under the control of the control unit 50.

As a result, when the authentication processor 56 confirms the user using the client terminal 2 as a registered user since the valid period of the authentication session ID information received from the client terminal 2 is not expired, it is determined that the authentication ticket issuance request is a rightful request.

When the authentication processor 56 confirms the user using the client terminal 2 as a registered user, the control unit 50 goes on to next step SP18.

At step SP18, the authentication processor 56 issues an authentication ticket allowing access to the music data distribution server SV1 indicated by the shop code, as portal authentication result information, based on the shop code and the authentication issuance request signal received from the client terminal 2 at above step SP17, under the control of the control unit 50.

Then the authentication processor 56 temporarily stores the issued authentication ticket in the authentication information storage unit 57, and extends the valid period of the authentication session ID information issued for the client terminal 2, under the control of the control unit 50.

The control unit 50 transmits the authentication ticket together with the authentication session ID information with valid period extended by the authentication processor 56, to the client terminal 2 via the communication controller 52 and the network interface 53 in order.

At step 19, the control unit 23 of the client terminal 2 receives the authentication ticket and the authentication session ID information with extended valid period, from the portal server 3 via the network interface 33 and the communication controller 32 in order, and gives the received authentication session ID information to the authentication processor 37.

The control unit 23 transmits the authentication ticket received from the portal server 3, together with the authentication request signal to the music data distribution server SV1 via the communication controller 32 and the network interface 33 in order.

The authentication processor 37 temporarily stores the authentication session ID information with extended valid period received from the portal server 3 in the authentication information storage unit 38 by replacing the previous authentication session ID information, under the control of the control unit 23, thereby updating the authentication session ID information temporarily stored at above step SP16 to the authentication session ID information with extended valid period.

At step SP20, the control unit 70 of the music data distribution server SV1 receives the authentication request signal and the authentication ticket from the client terminal 2 via the network interface 73 and the communication controller 72 in order.

Then the control unit 70 transmits the authentication ticket received from the client terminal 2, together with the authentication ticket confirmation request signal requesting confirmation of the authentication ticket to the portal server 3 via the communication controller 72 and the network interface 73 in order.

At step SP21, the control unit 50 of the portal server 3 receives the authentication ticket confirmation request signal and the authentication ticket from the music data distribution server SV1 via the network interface 53 and the communication controller 52 in order, and gives the received authentication ticket confirmation request signal and the authentication ticket to the authentication processor 56.

The authentication processor 56 performs the confirmation process on the authentication ticket received form the music data distribution server SV1, by comparing the authentication ticket received from the music data distribution server SV1 with the authentication ticket being temporarily stored in the authentication information storage unit 57, in response to the authentication ticket confirmation request signal, under the control of the control unit 50.

As a result, when the authentication processor 56 confirms the authentication ticket received from the music data distribution server SV1 as a rightful ticket, the control unit 50 transmits confirmation result information indicating that the authentication ticket is confirmed as a rightful ticket, to the music data distribution server SV1 via the communication controller 52 and the network interface 53 in order.

At step SP22, the control unit 70 of the music data distribution server SV1 receives the confirmation result information from the portal server 3 via the network interface 73 and the communication controller 72 in order, and gives the received confirmation result information to the authentication processor 75.

The authentication processor 75 issues service session ID information for the current connection status of communication between the client terminal 2 and the music data distribution server SV1 as server authentication result information according to the confirmation result information, and temporarily stores the issued service session ID information in the authentication information storage unit 77, under the control of the control unit 70.

The control unit 70 transmits the service session ID information, which the authentication processor 75 issued for the client terminal 2, to the client terminal 2 via the communication controller 72 and the network interface 73 in order.

At step SP23, the control unit 23 of the client terminal 2 receives the service session ID information from the music data distribution server SV1 via the network interface 33 and the communication controller 32 in order, and temporarily stores the received service session ID information in the authentication information storage unit 38 with the authentication processor 37.

The control unit 23 transmits a page information acquisition request signal requesting page information for music data distribution, together with the service session ID information, which was received from the music data distribution server SV1 and is temporarily stored in the authentication information storage unit 38, to the music data distribution server SV1 via the communication controller 32 and the network interface 33 in order.

At step SP24, the control unit 70 of the music data distribution server SV1 receives the page information acquisition request signal and the service session ID information from the client terminal 2 via the network interface 73 and the communication controller 72 in order, and gives the received service session ID information to the authentication processor 75.

The authentication processor 75 performs the user authentication process by comparing the service session ID information received from the client terminal 2 with the service session ID information which was issued for the client terminal 2 and is temporarily stored in the authentication information storage unit 77 at above step SP22, under the control of the control unit 70.

When the authentication processor 75 confirms the user using the client terminal 2 as a registered user since the valid period of the service session ID information received form the client terminal 2 is not expired, it is determined that the acquisition request for page information for music data distribution from the client terminal 2 is a rightful request.

When the authentication processor 75 confirms the user using the client terminal 2 as a rightful user, the control unit 70 goes onto next step SP25.

At step SP25, the control unit 70 reads the user-requested page information for music data distribution from the page information storage unit 76, and extends the valid period of the service session ID information issued for the client terminal 2 with the authentication processor 75.

Then the control unit 70 transmits the page information for music data distribution read from the page information storage unit 76, together with the service session ID information with valid period extended by the authentication processor 75, to the client terminal 2 via the communication controller 72 and the network interface 73 in order.

At step SP26, the control unit 23 of the client terminal 2 receives the page information for music data distribution and the service session ID information with extended valid period, from the music data distribution server SV1 via the network interface 33 and the communication controller 32 in order, and gives the received page information for music data distribution to the page information creator 36 and also gives the service session ID information received from the music data distribution server SV1 to the authentication processor 37.

The authentication processor 37 temporarily stores the service session ID information with extended valid period received from the music data distribution server SV1 in the authentication information storage unit 38 by replacing the previous service session ID information, under the control of the control unit 23, thereby updating the service session ID information temporarily stored at above step SP23 to the service session ID information with extended valid period.

The page information creator 36 creates video data based on the page information for music data distribution, and gives the created video data to the display controller 24.

The display controller 24 performs the digital-to-analog conversion on the video data given from the page information creator 36, and gives the obtained analog video signal to the display unit 25, so that the display unit 25 displays the page for music data distribution as video based on the analog video signal.

(1-7-3) Music-Related Service Provision Process

Figure 9:
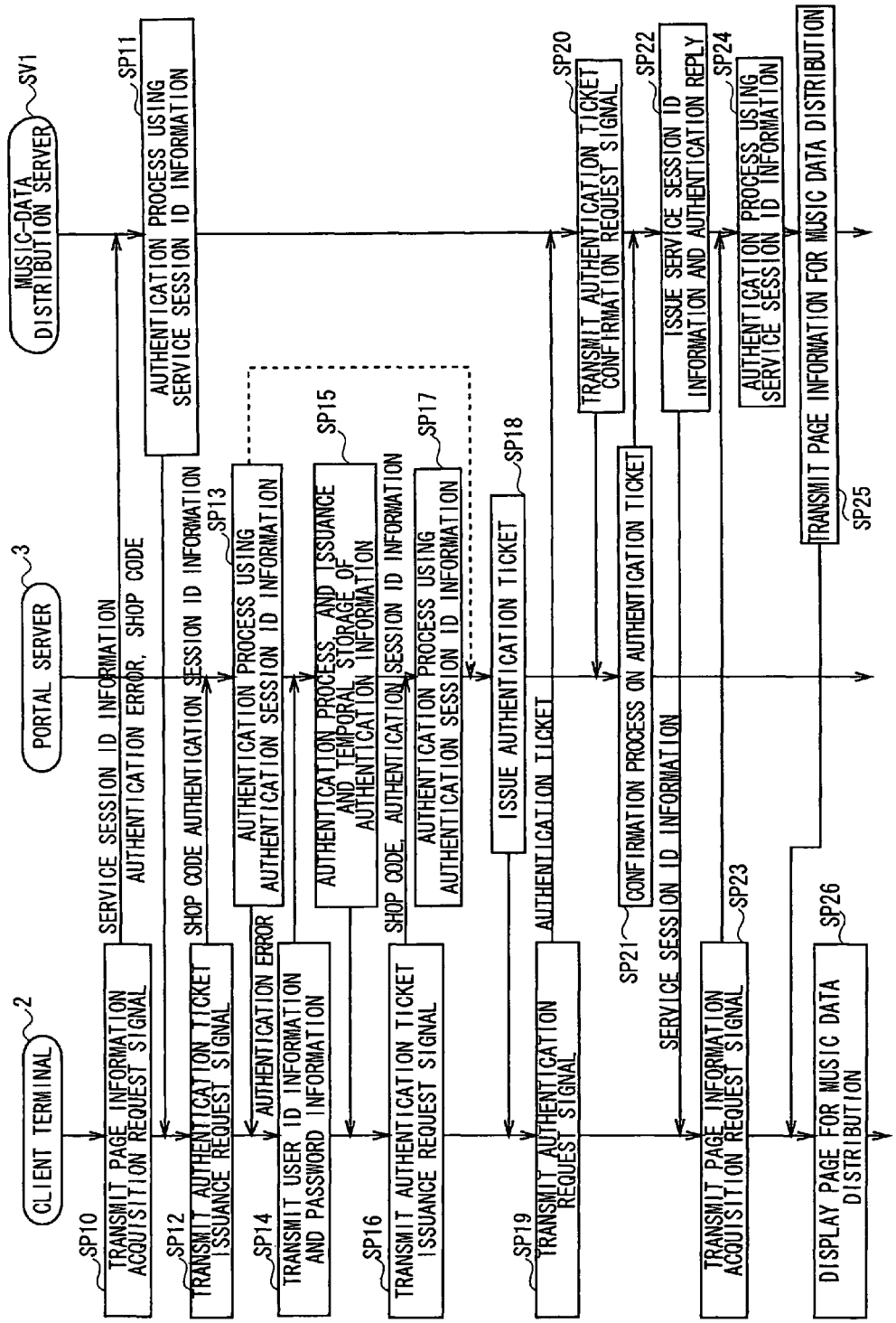
FIG. 9 is a sequence chart showing a user authentication process that is conducted between the client terminal and the music data distribution server.

Next, with reference to FIG. 10 to FIG. 13, a music-related provision process for a case where the client terminal 2 receives a music data distribution service, a sales service and a radio broadcast information distribution service by using page information for music data distribution, page information for package media sales, and page information for OnAir list information distribution that are obtained from the music data distribution server SV1, the sales server SV2, and the radio broadcast information distribution server SV3 in the user authentication process after the user authentication process is completed between the client terminal 2 and the music data distribution server SV1, the sales server SV2, and the radio broadcast information distribution server SV3 as described in FIG. 9.

(1-7-3-1) Music Data Distribution Service Provision Process

Figure 10:
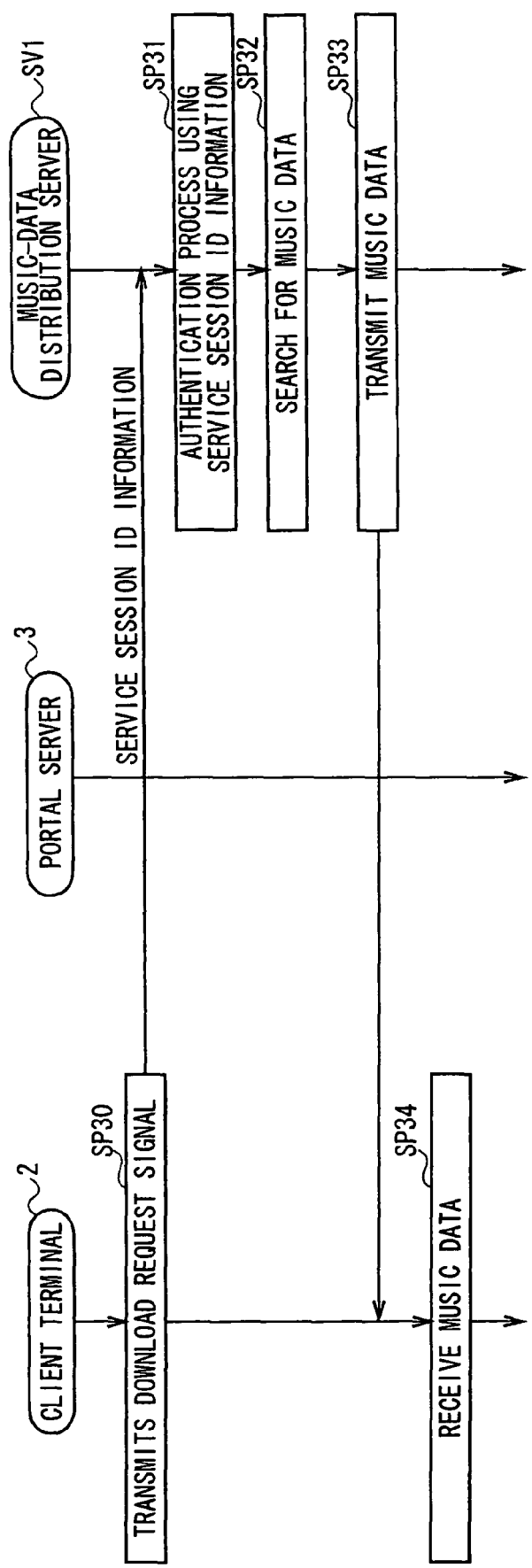
FIG. 10 is a sequence chart showing a music data distribution service provision process.

With reference to FIG. 10, a music data distribution service provision process where the client terminal 2 receives a music data distribution service from the music data distribution server SV1 will be described.

At step SP30, when a control command specifying a part of a page for music data distribution being displayed as video on the display unit 25 is entered via the input processor 21, the control unit 23 of the client terminal 2 creates a download request signal requesting download of desired music data in response to the entered control command.

Then the control unit 23 transmits the download request signal together with the service session ID information which was issued from the music data distribution server SV1 and is temporarily stored in the authentication information storage unit 38, to the music data distribution server SV1 via the communication controller 32 and the network interface 33 in order.

At step SP31, the control unit 70 of the music data distribution server SV1 receives the download request information and the service session ID information from the client terminal 2 via the network interface 73 and the communication controller 72 in order, and gives the received service session ID information to the authentication processor 75.

The authentication processor 75 performs the user authentication process by comparing the service session ID information received from the client terminal 2 with the services session ID information being temporarily stored in the authentication information storage unit 77.

As a result, when the authentication processor 75 confirms the user requesting the download of the music data by using the client terminal 2 as a registered user, the control unit 70 goes on to step SP32.

At step SP32, based on the search key included in the download request signal, the searching unit 79 searches the plurality of music data in the music data storage unit 78 for the download-target music data meeting the search conditions indicated by the search key.

When the searching unit 79 finds the music data, the control unit 70 extends the valid period of the service session ID information issued for the client terminal 2, with the authentication processor 75, and goes on to next step SP33.

At step SP33, the control unit 70 reads the download-target music data, which was found by the searching unit 79, from the music data storage unit 78, and transmits the read download-target music data together with the service session ID information with valid period extended by the authentication processor 75, to the client terminal 2 via the communication controller 72 and the network interface 73 in order.

At step SP34, the control unit 23 of the client terminal 2 receives the download-target music data and the service session ID information with extended valid period from the music data distribution server SV1 via the network interface 33 and the communication controller 32 in order, and stores the received music data in the memory medium 29 and gives the service session ID information received from the music data distribution server SV1 to the authentication processor 37.

The authentication processor 37 temporarily stores the service session ID information with extended valid period received from the music data distribution server SV1 in the authentication information storage unit 38 by replacing the previous service session ID information, under the control of the control unit 23, thereby updating the service session ID information temporarily stored in the authentication information storage unit 38.

In this way, the client terminal 2 is capable of using the music data distribution service provided by the music data distribution server SV1 to download music data desired by the user.

(1-7-3-2) Sales Service Provision Process

Figure 11:
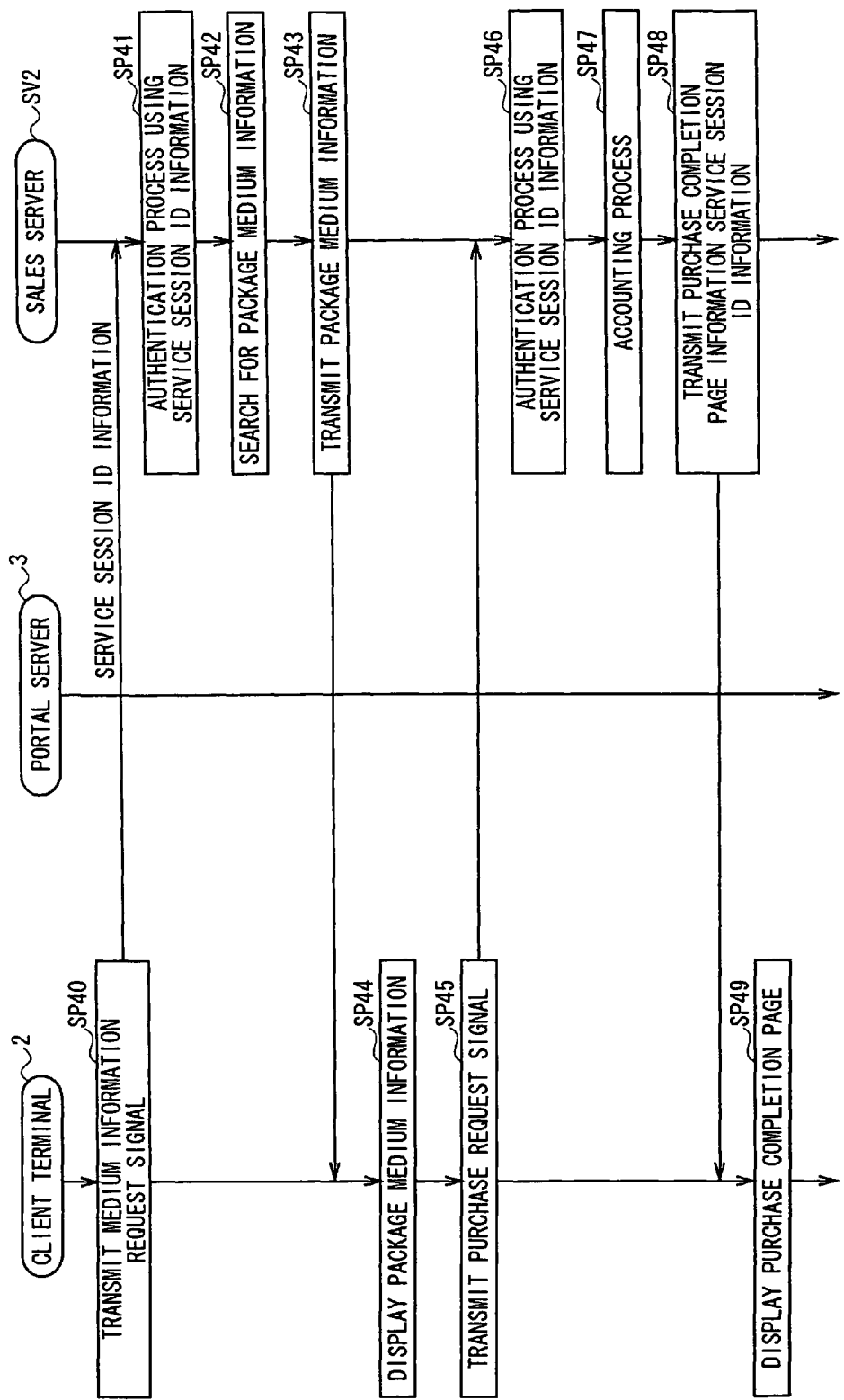
FIG. 11 is a sequence chart showing a sales service provision process.

Now a sales service provision process in which the client terminal 2 receives a sales service from the sales server SV2 will be described with reference to FIG. 11.

At step SP40, when a control command specifying a part of a page for package media sales being displayed as video on the display unit 25 is entered via the input processor 21, the control unit 23 of the client terminal 2 creates a medium information request signal requesting package medium information on a specified package medium in response to the entered control command.

The control unit 23 transmits the medium information request signal together with the service session ID information which was issued from the sales server SV2 and is temporarily stored in the authentication information storage unit 38, to the sales server SV2 via the communication controller 32 and the network interface 33 in order.

At step SP41, the control unit 90 of the sales server SV2 receives the medium information request signal and the service session ID information from the client terminal 2 via the network interface 93 and the communication controller 92 in order, and gives the received service session ID information to the authentication processor 95.

The authentication processor 95 performs the user authentication process by comparing the service session ID information received from the client terminal 2 with the service session ID information temporarily stored in the authentication information storage unit 97, under the control of the control unit 90.

When the authentication processor 95 confirms the user requesting the package medium information on the package medium by using the client terminal 2 as a registered user, the control unit 90 goes on to step SP42.

At step SP42, based on the search key included in the medium information request signal, the searching unit 99 searches the plurality of package medium information in the package medium information storage unit 98 for the package medium information on the specified package medium meeting the searching conditions indicated by the search key.

When the searching unit 99 finds the package medium information, the control unit 90 extends the valid period of the service session ID information issued for the client terminal 2, with the authentication processor 95, and goes on to next step SP43.

At step SP43, the control unit 90 reads the package medium information found by the searching unit 99, from the package medium information storage unit 98, and transmits the read package medium information together with the service session ID information with valid period extended by the authentication processor 95, to the client terminal 2 via the communication controller 92 and the network interface 93 in order.

At step SP44, the control unit 23 of the client terminal 2 receives the package medium information and the service session ID information with extended valid period from the sales server SV2 via the network interface 33 and the communication controller 32 in order, and gives the received package medium information to the page information creator 36 and gives the service session ID information received from the sales server SV2 to the authentication processor 37.

The authentication processor 37 temporarily stores the service session ID information with extended valid period received from the sales server SV2 in the authentication information storage unit 38 by replacing the previous service session ID information, under the control of the control unit 23, thereby updating the service session ID information being temporarily stored in the authentication information storage unit 38.

The page information creator 36 creates video data based on the package medium information received from the control unit 23, converts the created video data into an analog video signal through the display controller 24, and gives the analog video signal to the display unit 25.

When the display unit 25 displays the package medium information as video based on the analog video signal, the control unit 23 goes on to step next step SP45.

At step SP45, when a control command requesting purchase of a package medium corresponding to the package medium information being displayed as video on the display unit 25 is entered via the input processor 21, the control unit 23 creates a purchase request signal requesting purchase of the package medium in response to the entered control command.

The control unit 23 transmits the purchase request signal together with the service session ID information (service session ID information) which was received from the sales server SV2 and is temporarily stored in the authentication information storage unit 38, to the sales server SV2 via the communication controller 32 and the network interface 33 in order.

At step SP46, the control unit 90 of the sales server SV2 receives the purchase request signal and the service session ID information from the client terminal 2 via the network interface 93 and the communication controller 92 in order, and gives the received service session ID information to the authentication processor 95.

The authentication processor 95 performs the user authentication process by comparing the service session ID information received from the client terminal 2 with the service session ID information being temporarily stored in the authentication information storage unit 97.

As a result, when the authentication processor 95 confirms the user requesting the purchase of the package medium by using the client terminal 2 as a registered user, the control unit 90 goes on to next step SP47.

At step SP47, the control unit 90 performs a purchase process to sell the purchase-requested package medium to the user using the client terminal 2, and transmits accounting information for charging the user for the purchase of the package medium to the accounting server SV5 via the communication controller 92 and the network interface 93 in order, so that the accounting server SV5 performs the accounting process to charge the user for the purchase of the package medium.

The control unit 90 extends the valid period of the service session ID information issued for the client terminal 2 with the authentication processor 95.

At step SP48, after the accounting process is completed, the control unit 90 transmits purchase completion page information showing that the purchase process for the package medium is completed, together with the service session ID information with valid period extended by the authentication processor 95, to the client terminal 2 via the communication controller 92 and the network interface 93 in order.

At step SP49, the control unit 23 of the client terminal 2 receives the purchase completion page information and the service session ID information with extended valid period from the sales server SV2 via the network interface 33 and the communication controller 32 in order, and gives the received purchase completion page information to the page information creator 36 and gives the service session ID information received from the sales server SV2 to the authentication processor 37.

The authentication processor 37 temporarily stores the service session ID information with extended valid period received from the sales server SV2 in the authentication information storage unit 38 by replacing the previous service session ID information, under the control of the control unit 23, thereby updating the service session ID information being temporarily stored in the authentication information storage unit 38.

The page information creator 36 creates video data based on the purchase completion page information given from the control unit 23, and converts the created video data into an analog video signal through the display controller 24 and gives the resultant to the display unit 25.

The control unit 23 controls the display unit 25 to display the purchase completion page as video based on the analog video signal.

In this way, the client terminal 2 uses the sales service provided by the sales server SV2, allowing the user to purchase desired package media.

(1-7-3-3) On Air List Information Distribution Service Provision Process

Figure 12:
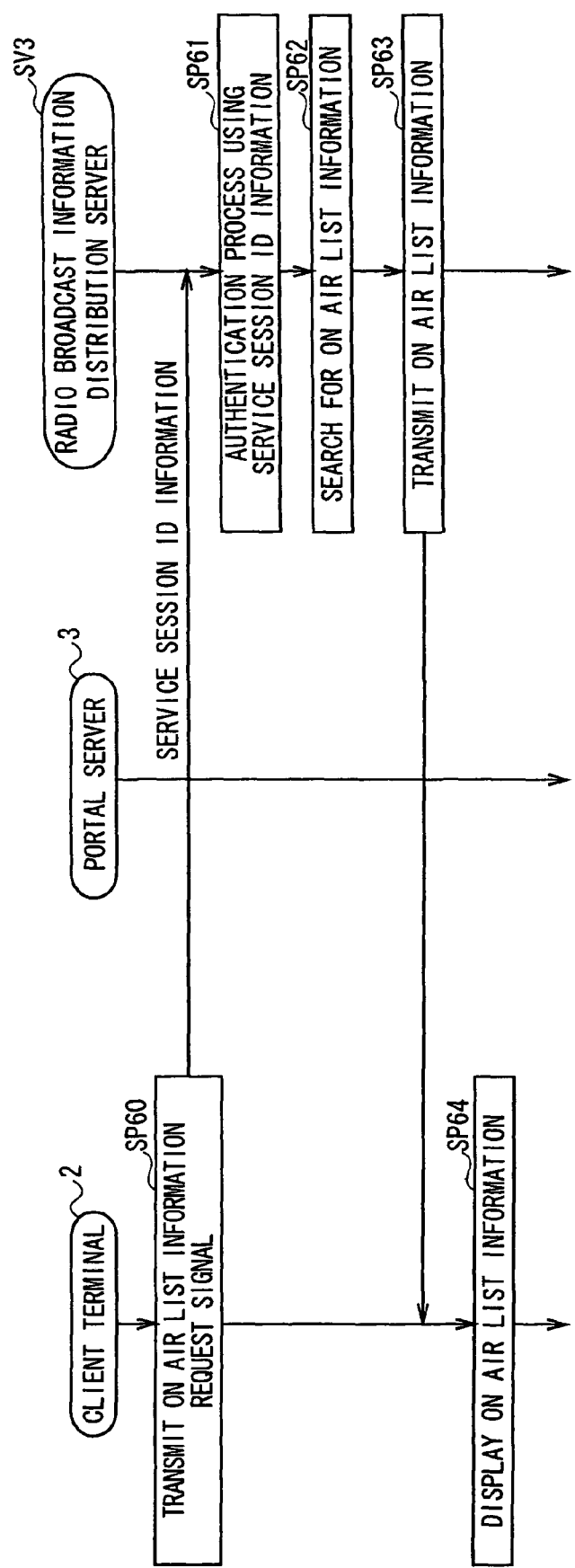
FIG. 12 is a sequence chart showing a radio broadcast information (On Air list information) service provision process.

Next with reference to FIG. 12, a radio broadcast information distribution service in that the client terminal 2 receives an On Air list information distribution service as radio broadcast information distribution service from the radio broadcast information distribution server SV3 will be described.

At step SP60, when a search key for searching for desired On Air list information is entered in an input box on the page for On Air list information distribution being displayed as video on the display unit 25 and a control command corresponding to the characteristic letters of the entered search key is entered via the input processor 21, the control unit 23 of the client terminal 2 creates an On Air list information request signal requesting download of the desired On Air list information according to the entered control command.

The control unit 23 transmits the On Air list information request signal together with the service session ID information which was issued from the radio broadcast information distribution server SV3 and is temporarily stored in the authentication information storage unit 38, to the radio broadcast information distribution server SV3 via the communication controller 32 and the network interface 33 in order.

At step SP61, the control unit 110 of the radio broadcast information distribution server SV3 receives the On Air list information request signal and the service session ID information from the client terminal 2 via the network interface 113 and the communication controller 112 in order, and gives the received service session ID information to the authentication processor 115.

The authentication processor 115 performs the user authentication process by comparing the service session ID information received from the client terminal 2 with the service session ID information temporarily stored in the authentication information storage unit 120, under the control of the control unit 110.

As a result, when the authentication processor 115 confirms the user requesting the On Air list information by using the client terminal 2 as a registered user, the control unit 110 goes on to step SP62.

At step SP62, based on the search key included in the On Air list information request signal, the searching unit 118 searches the entire On Air list information in the On Air list information storage unit 117 for a prescribed part meeting the searching conditions indicated by the search key as desired On Air list information.

When the searching unit 118 finds the On Air list information, the control unit 110 extends the valid period of the service session ID information issued for the client terminal 2, with the authentication processor 115, and goes on to next step SP63.

At step SP63, the control unit 110 reads the On Air list information found by the searching unit 118, from the On Air list information storage unit 117, and transmits the read On Air list information together with the service session ID information with valid period extended by the authentication processor 115, to the client terminal 2 via the communication controller 112 and the network interface 113 in order.

At step SP64, the control unit 23 of the client terminal 2 receives the On Air list information and the service session ID information with extended valid period from the radio broadcast information distribution server SV3 via the network interface 33 and the communication controller 32 in order, and gives the received On Air list information to the page information creator 36 and gives the service session ID information received from the radio broadcast information distribution server SV3, to the authentication processor 37.

The authentication processor 37 temporarily stores the service session ID information with extended valid period received from the radio broadcast information distribution server SV3 in the authentication information storage unit 38 by replacing the previous service session ID information, under the control of the control unit 23, thereby updating the service session ID information being temporarily stored in the authentication information storage unit 38.

The page information creator 36 creates video data based on the On Air list information received from the control unit 23, and converts the created video data into an analog video signal through the display controller 24, and gives the analog video signal to the display unit 25, so that the display unit 25 displays the On Air list information as video based on the analog video signal.

In this way, the client terminal 2 uses the radio broadcast information distribution service provided by the radio broadcast information distribution server SV3, allowing the user to obtain desired On Air list information.

(1-7-3-4) Now On Air Information Distribution Service Provision Process

Figure 13:
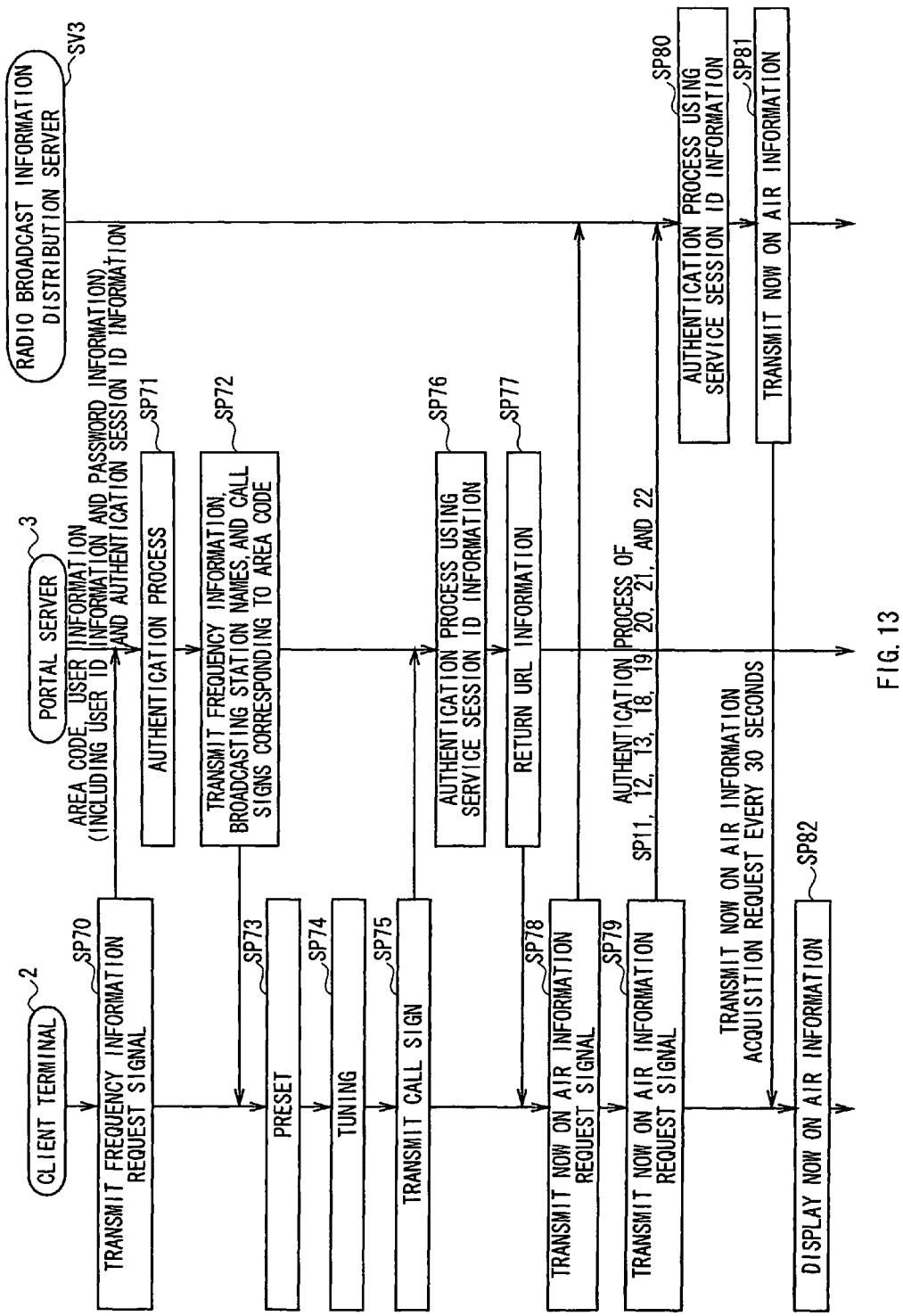
FIG. 13 is a sequence chart showing a radio broadcast information (Now On Air information) service provision process.

Next a radio broadcast information distribution service provision process for a case where the client terminal 2 receives a Now On Air information distribution service as radio broadcast information distribution service from the radio broadcast information distribution server SV3 will be described with reference to FIG. 13.

In this connection, the radio broadcast information distribution server SV3 providing the Now On Air information is prepared for each radio station (call sign).

In addition, the client terminal 2 may not store URL information of the radio broadcast information distribution server SV3 corresponding to each radio station at an initial stage.

Therefore, the radio broadcast information distribution service provision process will be described in view of a case where the URL information of each radio broadcast information distribution server SV3 is managed by the portal server 3 for each call sign of the radio station.

In addition, in this radio broadcast information distribution service provision process, it is assumed that authentication session ID information or the like is not temporarily stored in the authentication information storage unit 38 when the client terminal 2 requests the portal server 3 for frequency information indicating a broadcasting frequency to automatically preset the broadcasting frequency of a radio station. Therefore, the client terminal 2 first transmits the user ID information and password information to the portal server 3.

At step SP70, when an operation command requesting automatic presetting of the broadcasting frequency of each radio station is entered via the input processor 21, the control unit 23 of the client terminal 2 transmits a frequency information request, signal requesting the frequency information of the broadcasting frequency of each receivable radio station, together with the area code entered by the user and the user ID information and password information being stored in the authentication information storage unit 38, to the portal server 3 via the communication controller 32 and the network interface 33 in order.

At step SP71, the control unit 50 of the portal server 3 receives the frequency information request signal, the area code, the user ID information and the password information from the client terminal 2 via the network interface 53 and the communication controller 52 in order, and gives the user ID information and the password information received from the client terminal 2 to the authentication processor 56.

The authentication processor 56 performs the user authentication process by comparing the user ID information and the password information received from the client terminal 2 with the customer information being registered in the customer database unit 54, under the control of the control unit 50.

As a result, when the authentication processor 56 confirms the user using the client terminal 2 as a registered user, and the frequency information acquisition request from the client terminal 2 as a rightful request, it issues authentication session ID information for the current connection status of communication between the client terminal 2 and the portal server 3, and temporarily stores the issued authentication session ID information in the authentication information storage unit 57.

When the authentication processor 56 confirms the user as a registered user, the control unit 50 goes on to step SP72.

At step SP72, the control unit 50 reads a list of frequency information, radio station names and call signs corresponding to the area code, out of a list of a plurality of frequency information, radio station names, and call signs in a frequency information storage unit 58, based on the area code received from the client terminal 2.

Then the control unit 50 transmits the list of frequency information, radio station names, and call signs read from the frequency information storage unit 58, together with the authentication session ID information issued by the authentication processor 56 for the client terminal 2 at the above step SP71, to the client terminal 2 via the communication controller 52 and the network interface 53 in order.

At step SP73, the control unit 23 of the client terminal 2 receives the list of frequency information, radio station names and call signs from the portal server 3 via the network interface 33 and the communication controller 32 in order, gives the authentication session ID information received from the portal server 3 to the authentication processor 37, and gives the list of frequency information, radio station names, and call signs to the display controller 24.

The authentication processor 37 temporarily stores the authentication session ID information received from the portal server 3 in the authentication information storage unit 38, under the control of the control unit 23.

The display controller 24 gives the list of frequency information, radio station names and call signs received from the control unit 23 to the display unit 25, so as to display the list on the display unit 25.

In addition, the control unit 23 presets the selected frequency information, radio station names and call signs in the storage medium 29 based on the selected command entered via the input processor 21, and goes on to step SP74.

At step SP74, the control unit 23 controls the tuner 31 to extract the radio broadcast signal of the radio broadcast being broadcasted at the broadcasting frequency corresponding to a tuning control command, out of the radio broadcasting waves, based on the tuning control command entered via the input processor 21.

The tuner 31 extracts the radio broadcast signal being broadcasted at the broadcasting frequency, out of the radio broadcasting waves received by the broadcast signal receiving unit 30, and performs a prescribed reception process, such as decoding, and gives the resultant audio data to the audio controller 26.

The audio controller 26 converts the audio data received from the tuner 31 into an analog audio signal which is then given to the speaker 27, so that the speaker 27 can output the sound of the selected radio program.

At step SP75, the radio broadcast display controller 39 reads a call sign being stored for the frequency information indicating the broadcasting frequency corresponding to the above tuning control command, from the storage medium 29, and transmits the read call sign together with the authentication session ID information being temporarily stored in the authentication information storage unit 38, to the portal server 3 via the communication controller 32 and the network interface 33 in order, under the control of the control unit 23.

At step SP76, the control unit 50 of the portal server 3 receives the call sign and the authentication session ID information from the client terminal 2 via the network interface 53 and the communication controller 52 in order, and gives the received authentication session ID information to the authentication processor 56.

The authentication processor 56 performs the user authentication process by comparing the authentication session ID information received from the client terminal 2 with the authentication session ID information being temporarily stored in the authentication information storage unit 57, under the control of the control unit 50.

As a result, when the authentication processor 56 confirms that the authentication session ID information received from the client terminal 2 is within the valid period and also confirms the user transmitting the call sign by using the client terminal 2 as a registered user, the control unit 50 goes on to next step SP77.

At step SP77, the control unit 50 searches the plurality of URL information in the URL storage unit 59 for the URL information corresponding to the call sign based on the call sign received from the client terminal 2.

In addition, the control unit 50 extends the valid period of the authentication session ID information issued for the client terminal 2 with the authentication processor 56.

The control unit 50 reads the found URL information from the URL storage unit 59 and transmits the read URL information together with the authentication session ID information with valid period extended by the authentication processor 56, to the client terminal 2 via the communication controller 52 and the network interface 53 in order.

At step SP78, the control unit 23 of the client terminal 2 receives the URL information and the authentication session ID information with extended valid period from the portal server 3 via the network interface 33 and the communication controller 32 in order, and gives the received authentication session ID information to the authentication processor 37 and gives the URL information to the radio broadcast display controller 39.

The authentication processor 37 temporarily stores the authentication session ID information with extended valid period received from the portal server 3, in the authentication information storage unit 38 by replacing the previous authentication session ID information, under the control of the control unit 23, thereby updating the authentication session ID information being temporarily stored in the authentication information storage unit 38.

The radio broadcast display controller 39 temporarily stores the URL information received form the control unit 23 in the storage medium 29 in association with the call sign being stored in the storage medium 29, under the control of the control unit 23.

Then the radio broadcast display controller 39 transmits a Now On Air information request signal requesting Now On Air information, together with the service session ID information which was received from the radio broadcast information distribution server SV3 and is temporarily stored in the authentication information storage unit 38, to the radio broadcast information distribution server SV3 via the communication controller 32 and the network interface 33 in order, according to the URL information temporarily stored in the storage medium 29, under the control of the control unit 23.

In this connection, in this radio broadcast information distribution service provision process, a process of transmitting a Now On Air information request signal and service session ID information from the client terminal 2 to the radio broadcast information distribution server SV3 at step SP78 corresponds to a process of the above step SP10 of FIG. 9.

Therefore, in this radio broadcast information distribution service provision process, after step SP78 but before step SP79, the client terminal 2, the radio broadcast information distribution server SV3 and the portal server 3 perform the same user authentication processes as step SP11 to step SP13 and step SP18 to step SP22 in FIG. 9.

At step SP79, the radio broadcast display controller 39 of the client terminal 2 transmits the Now On Air information request signal according to the URL information temporarily stored in the storage medium 29, together with the service session ID information which was received from the radio broadcast information distribution server SV3 and is temporarily stored in the authentication information storage unit 38, to the radio broadcast information distribution server SV3 via the communication controller 32 and the network interface 33, under the control of the control unit 23.

At step SP80, the control unit 110 of the radio broadcast information distribution server SV3 receives the Now On Air information request signal and the service session ID information from the client terminal 2 via the network interface 113 and the communication controller 112 in order, and gives the received authentication session ID information to the authentication processor 115.

The authentication processor 115 performs the user authentication process by comparing the service session ID information received from the client terminal 2 with the service session ID information temporarily stored in the authentication information storage unit 120, under the control of the control unit 110.

As a result, when the authentication processor 115 confirms the user using the client terminal 2 as a registered user, the authentication processor 115 determines that the Now On Air information acquisition request from the client terminal 2 is a rightful request.

When the authentication processor 115 confirms the user using the client terminal 2 as a registered user, the control unit 110 extends the valid period of the service session ID information issued for the client terminal 2 with the authentication processor 115, and goes on to step SP81.

At step SP81, the control unit 110 reads the Now On Air information from the Now On Air information storage unit 119, and transmits the read Now On Air information together with the service session ID information with valid period extended by the authentication processor 115, to the client terminal 2 via the communication controller 112 and the network interface 113 in order.

At step SP82, the control unit 23 of the client terminal 2 receives the Now On Air information and the service session ID information with extended valid period from the radio broadcast information distribution server SV3 via the network interface 33 and the communication controller 32 in order, and gives the received service session ID information to the authentication processor 37 and gives the Now On Air information to the radio broadcast display controller 39.

The authentication processor 37 temporarily stores the service session ID information with extended valid period received from the radio broadcast information distribution server SV3 in the authentication information storage unit 38 by replacing the previous service session ID information, under the control of the control unit 23, thereby updating the service session ID information temporarily stored in the authentication information storage unit 38.

The radio broadcast display controller 39 gives the Now on Air information received from the control unit 23 to the display unit 25 via the display controller 24, so that the display unit 25 can display the Now On Air information on the radio program of the radio broadcast being received.

Then, in this radio broadcast information distribution service provision process, after that, the client terminal 2 periodically and repeatedly transmits a Now On Air information acquisition request of step SP79 and the radio broadcast information distribution server SV3 performs the processes of the step SP80 and step SP81 in response to the acquisition request from the client terminal 2.

Thereby the client terminal 2 occasionally updates the program name, the broadcasting start time, and the broadcasting end time of a radio program being received, and the title, the artist name and the broadcasting start time of a song currently playing in the radio program, as Now On Air information to display them on the display unit 25 of the client terminal 2.

(1-8) Hardware Circuit Block Configuration of Client Terminal 2

(1-8-1) Circuit Configuration

Next the hardware configuration of the client terminal 2 will be described with reference to hardware circuit blocks. In the hardware configuration of the client terminal 2 with the hardware circuit blocks, a part of functions are realized by software modules to be described later.

Figure 14:
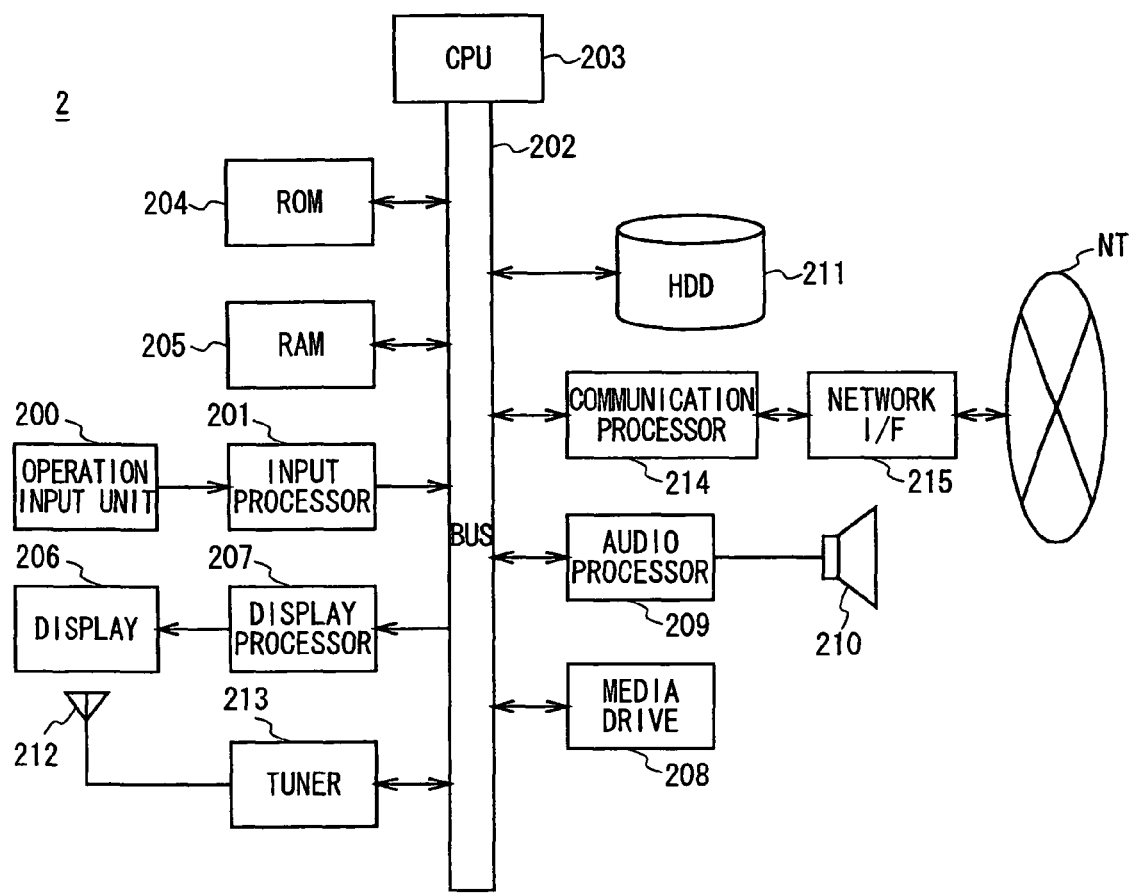
FIG. 14 is a block diagram showing the configuration of the client terminal by using hardware circuit blocks.

Referring to FIG. 14, when the user operates an operation input unit 200 comprising various operation buttons-provided on the case of the client terminal 2 and a remote controller (not shown), the client terminal 2 recognizes this with the operation input unit 200 and gives an operation input signal corresponding to the operation to an input processor 201.

The input processor 201 performs a prescribed process-on the received operation input signal to convert the operation input signal into an operation command, and gives this to a CPU (Central Processing Unit) 203 via a bus 202.

The CPU 203 reads various programs such as a basic program and application programs being stored in a ROM (Read Only Memory) 204, and controls the entire operation according to the various programs, and also performs prescribed calculation processes and various processes according to the operation command received from the input processor 201.

A display 206 is a display device such as a liquid crystal display, for example, and may be directly or externally installed on the surface of the case.

When receiving a processing result of the CPU 203 and various video data via a display processor 207 as an analog video signal, the display 206 displays video based on the analog video signal.

A media drive 208 reads and plays content data being recorded on a CD or content data being recorded on a memory stick (trademark) having a flash memory in an outer package, or records content data to be recorded, on a CD or a memory stick.

Then when the media drive 208 reads video data from a CD or a memory stick as content data, it gives the reproduced video data to the display processor 207 via the bus 202.

In addition, when the media drive 208 reads audio data from the CD or the memory stick as content data, it gives the reproduced audio data to an audio processor 209.

The display processor 207 performs digital-to-analog conversion on the video data received via the bus 202, and gives the resultant analog video signal to the display 206, so that the display 206 displays video based on the analog video signal.

The audio processor 209 performs digital-to-analog conversion on the audio data received via the bus 202, and gives the resultant analog audio signal to a two-channel speaker 210, so that the speaker outputs stereo sound based on the analog audio signal.

The CPU 203 sends the content data read by the media drive 208, to a hard disk drive 211 via the bus 202, so that the hard disk drive 211 can store the content data as a content file.

In this connection, the CPU 203 manages the content data stored on the hard disk drive 211, in the directory structure described above in FIG. 3.

The CPU 203 also can read a content file stored on the hard disk drive 211, from the hard disk drive 211 as content data.

In this connection, when the CPU 203 reads video data from the hard disk drive 211 as content data, it gives the read video data to the display processor 207 via the bus 202.

In addition, when the CPU 203 reads audio data from the hard disk drive 211 as content data, it gives the read audio data to the audio processor 209.

An antenna 212 receives a radio broadcasting wave transmitted from each radio station, and gives it to the tuner 213 that is an AM/FM tuner.

The tuner 213 extracts the radio broadcast signal of the broadcasting frequency corresponding to the radio station specified via the operation input unit 200, out of radio broadcasting waves received via the antenna 212, and performs a prescribed reception process on the signal, and gives the resultant audio data to the audio processor 209 via the bus 202, under the control of the CPU 203.

The audio processor 209 gives the audio data received from the tuner 213, to the speaker 210 after converting the data into an analog audio signal, and the speaker 210 outputs the sound of the radio program being broadcasted from the radio station, so that the user can listen to the sound of the radio program.

In addition, the CPU 203 gives and records the audio data obtained by the tuner 213, onto the hard disk drive 211, thereby recording the sound of the radio program.

In addition, the CPU 203 connects to a network NT via a communication processor 214 and a network interface 215 in order, so as to access the portal server 3 and other servers SV1 to SV4 on the network NT, thus being capable of communicating data with the portal server 3 and the servers SV1 to SV4.

(1-8-2) Program Module Structure

Figure 15:
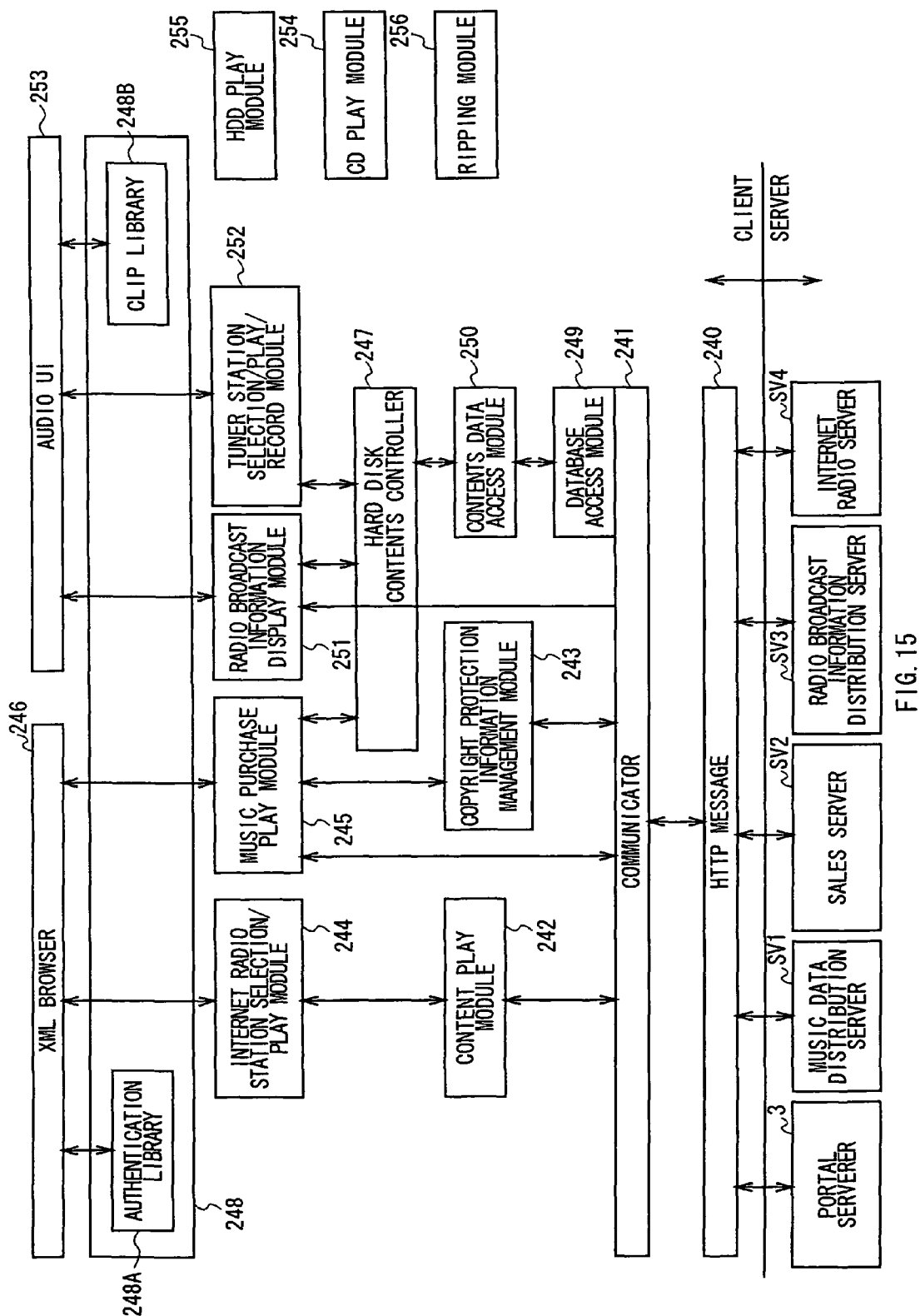
FIG. 15 is a schematic diagram showing program modules of the client terminal.

Referring to FIG. 15, program modules to be implemented in the client terminal 2 with the hardware configuration as shown with the hardware circuit blocks of FIG. 14 operate on the OS, and communicates with the portal server 3 and other servers SV1 to SV4.

An HTTP (Hyper Text Transfer Protocol) message program 240 is used for performing HTTP communication with the portal server 3 and the servers SV1 to SV4. A communicator program 241 is a program module for communicating data with the HTTP message program 240.

As a higher rank of the communicator program 241, a content reproduction module 242 for interpreting and reproducing content codec and a copyright protection management module 243 for treating information on copyright protection exist. As a higher rank of the content reproduction module 242 and the copyright protection management module 243, an Internet radio station selection/play module 244 for selecting and play an Internet radio and a music purchase play module 245 for purchasing songs and playing a trial song exist.

Audio data reproduced by the Internet radio station selection/play module 244 and the music purchase play module 245 is transferred to an audio processor 209, and thereby the speaker 210 outputs sound based on the data in the end.

As a higher rank of the Internet radio station selection/play module 244 and the music purchase play module 245, an XML browser 246 exists to interpret XML files from various servers and display video on the display 206.

For example, a song selected by the user via the XML browser 246 is subjected to a purchase process by the music purchase play module 245, and stored on the hard disk drive 211 via a hard disk content controller 247.

Note that the communicator program 241 is connected to an authentication library 248A of a library 248, and the authentication library 248A performs various authentication processes in cooperation with the portal server 3 and so on.

As a higher rank of the communicator program 241, a database access module 249, a content data access module 250, and the hard disk content controller 247 exist.

The database access module 249 accesses various databases created in the hard disk drive 211, the content data access module 250 accesses content data being stored in the hard disk drive 211, and the hard disk content controller 247 manages the content data being stored on the hard disk drive 211.

As a higher rank of the hard disk content controller 247, a radio broadcast information display module 251 for displaying the titles and artist names of songs broadcasted from a radio station and a tuner station selection/play/record module 252 for selecting a radio station, and storing (recording) content data of songs received from the radio station on the hard disk drive 211 exist.

For example, a song received from a radio station selected via the audio user interface 253 is recorded on the hard disk drive 211 via the content data access module 250.

In addition, audio data reproduced as content data by the tuner station selection/play/record module 252 is transferred to the audio processor 209, so that the speaker 210 outputs sound based on the data in the end.

The radio broadcast information display module 251 receives radio broadcast information including the title and artist name of a song currently playing from the radio station selected by the tuner station selection/play/record module 252, like Now On Air information, from the radio broadcast information distribution server SV3 via the HTTP message program 240, and displays this on the display 206 via an audio user interface (UI) 253.

Radio broadcast information displayed on the display 206 via the audio user interface 253 can be temporarily stored in a clip library 248B of the library 248, and is finally stored on the hard disk drive 211 via the database access module 249 according to user instruction.

A CD play module 254 controls the media drive 208 to play a CD.

Audio data reproduced from a CD by the CD play module 254 is transferred to the audio processor 209, and is output from the speaker as sound in the end.

An HDD play module 254 is connected to the hard disk content controller 247 and the copyright protection management module 243, which is not illustrated.

Thereby the HDD play module 254 reproduces audio data as content data read from the hard disk drive 211, according to copyright management information given from the copyright protection management module 243, under the control of the hard disk content controller 247.

The audio data reproduced by the HDD play module 254 according to the copyright management information is transferred to the audio processor 209, and is output from the speaker 210 as sound in the end.

A ripping module 256 is connected to the hard disk content controller 247 and the copyright protection management module 243, which is not illustrated.

Thereby the ripping module 256 controls the CD play module 254, the copyright protection management module 243, and the hard disk content controller 247 so as to store (that is, rip) audio data reproduced from a CD by the CD play module 254, together with copyright management information which is given from the copyright protection management module 243 to manage the audio data, on the hard disk of the hard disk drive 211, under the control of the hard disk content controller 247.

In the program modules described above, the HTTP message program 240 and the communicator program 241 are program modules which can realize the same function as the communication controller 32 of the client terminal 2 described above with reference to FIG. 2.

Further, the content reproduction module 242 is a program module which can realize the same function as the encoder/decoder unit 34 of the client terminal 2 described above with reference to FIG. 2.

Furthermore, the copyright protection management module 243 is a program module which can realize the same function as the copyright management unit 35 of the client terminal 2 described above with reference to FIG. 2.

Furthermore, the Internet radio station selection/play module 244 is a program module which can realize the same functions as the control unit 23 and the audio controller 26 of the client terminal 2 described above with reference to FIG. 2.

Furthermore, the music purchase play module 245 is a program module which can realize the same functions of the control unit 23 and the audio controller 26 of the client terminal 2 described above with reference to FIG. 2.

Furthermore, the XML browser 246 is a program module which can realize the same functions as the input processor 21 and the page information creator 36 of the client terminal 2 described above with reference to FIG. 2.

Furthermore, the hard disk content controller 247, the database access module 249 and the content data access module 250 are program modules which can realize the same functions of the control unit 23 of the client terminal 2 described above with reference to FIG. 2.

Furthermore, the authentication library 248A of the library 248 is a program module which can realize the same functions as the authentication processor 37 and the authentication information storage unit 38 of the client terminal 2 described above with reference to FIG. 2.

Furthermore, the clip library 248B of the library 248 is a program module which can realize the same function of the control unit 23 of the client terminal 2 described above with reference to FIG. 2.

Furthermore, the radio broadcast information display module 251 is a program module which can realize the same function as the radio broadcast display controller 39 of the client terminal 2 described above with reference to FIG. 2.

Furthermore, the tuner station selection/play/record module 252 is a program module which can realize the same functions as the control unit 23, the audio controller 26 and the tuner 31 of the client terminal 2 described above with reference to FIG. 2.

Furthermore, the audio user interface 253 is a program module which can realize the same functions as the input processor 21, the control unit 23 and the display controller 24 of the client terminal 2 described above with reference to FIG. 2.

Furthermore, the CD play module 254 is a program module which, can realize the same functions as the audio controller 26 and the external recording medium recording/reproduction unit 28 of the client terminal 2 described above with reference to FIG. 2.

Furthermore, the HDD play module 255 is a program module which can realize the same functions as the control unit 23 and the audio controller 26 of the client terminal 2 described above with reference to FIG. 2.

Furthermore, the ripping module 256 is a program module which can realize the same functions as the control unit 23, the external recording medium recording/reproduction unit 28, and the encoder/decoder unit 34 of the client terminal 2 described above with reference to FIG. 2.

Therefore, in the client terminal 2 with the hardware configuration described with reference to the hardware circuit blocks of FIG. 14, the CPU 203 can realize the same processes as the client terminal 2 with the hardware configuration described with reference to the functional circuit blocks of the FIG. 2, according to the above-described various program modules.

(1-9) Configuration of Portal Server

Figure 16:
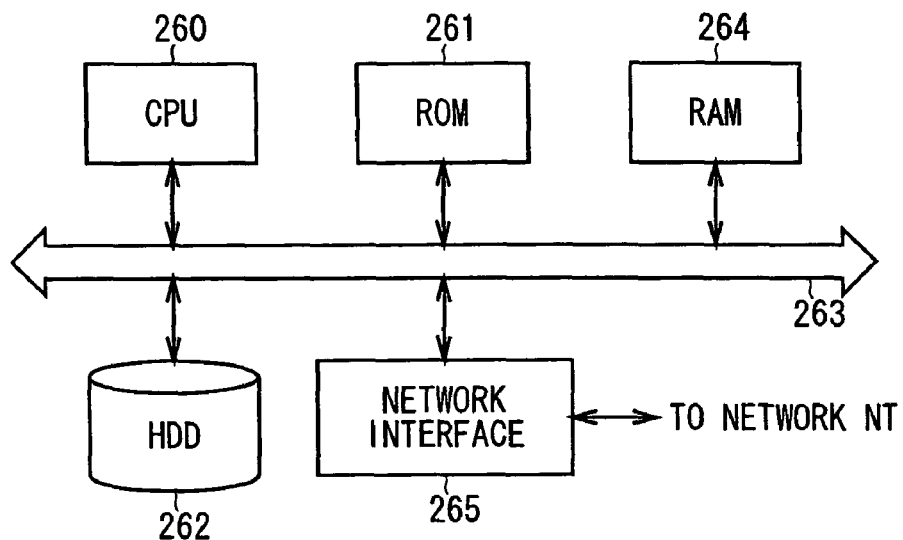
FIG. 16 is a block diagram showing the configuration of the portal server by using hardware circuit blocks.

The portal server 3 shown in FIG. 16 performs various processes including a user authentication process in such a manner that a CPU 260 performing entire control puts a basic program and various programs being stored in a ROM 261 or a hard disk drive 262, in a RAM 264 via a bus 263 and runs them.

For example, when the CPU 260 of the portal server 3 receives user ID information and password information from the client terminal 2 via the network NT and a network interface 265, it starts the user authentication process.

That is, in this portal server 3 with the hardware circuit block configuration, various programs to be stored in the ROM 261 or the hard disk drive 262 are appropriately selected according to the functions of the portal server 3 with the functional circuit block configuration described above with reference to FIG. 4, which can cause the CPU 260 to function like the control unit 50, the communication controller 52 and the authentication processor 56 of the portal server 3 and also use the hard disk drive 262 like the customer database unit 54, the page information storage unit 55, the authentication information storage unit 57, the frequency information storage unit 58, and the URL storage unit 59 of the portal server 3.

(1-10) Configuration of Music Data Distribution Server

Figure 17:
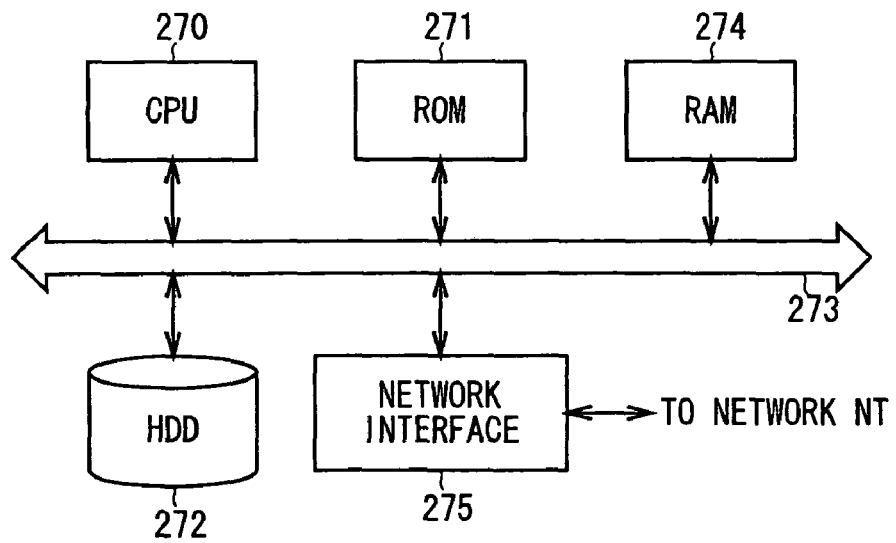
FIG. 17 is a block diagram showing the configuration of the music data distribution server by using hardware circuit blocks.

The music data distribution server SV1 shown in FIG. 17 performs a process for distributing music data to the client terminal 2 in such a manner that a CPU 270 controlling entire operation puts a basic program and various program being stored in a ROM 271 or a hard disk drive 272 in a RAM 274 via a bus 273 and runs them.

For example, when the client terminal 2 requests music data via the network NT and a network interface 275, the CPU 270 of the music data distribution server SV1 reads the music data from the hard disk drive 272 and transmits it to the client terminal 2.

That is, in the music data distribution server SV1 with the hardware circuit block configuration, various programs to be stored in the ROM 271 or the hard disk drive 272 are appropriately selected according to the functions of the music data distribution server SV1 with the functional circuit block configuration described above with reference to FIG. 5, which can cause the CPU 270 to function like the control unit 70, the communication controller 72, the authentication processor 75 and the searching unit 79 of the music data distribution server SV1, and use the hard disk drive 272 like the customer database unit 74, the page information storage unit 76, the authentication information storage unit 77, and the music data storage unit 78 of the music data distribution server SV1.

(1-11) Configuration of Sales Server

Figure 18:
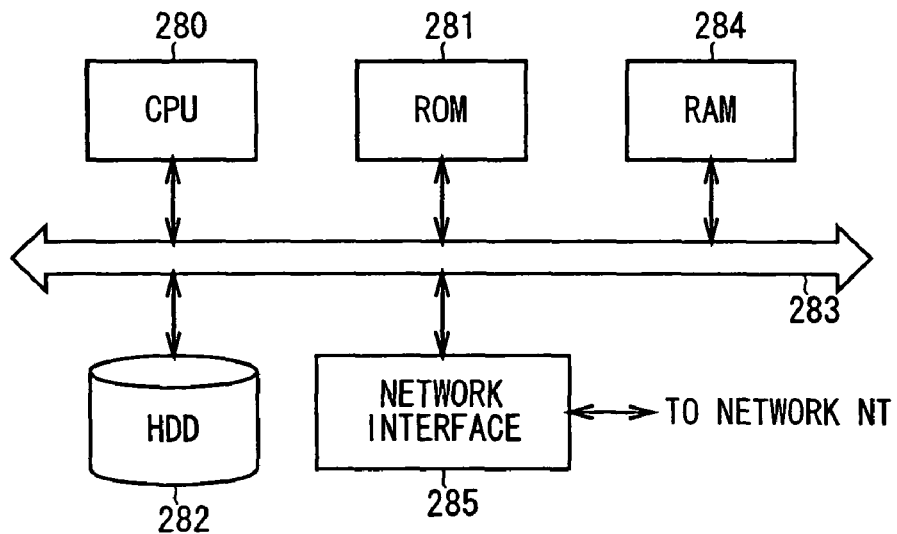
FIG. 18 is a block diagram showing the configuration of the sales server by using hardware circuit blocks.

The sales server SV2 shown in FIG. 18 performs a process for providing a sales service in such a manner that a CPU 280 controlling entire operation puts a basic program and various programs being stored in a ROM 281 or a hard disk drive 282, in a RAM 284 via a bus 283 and runs them.

For example, when the client terminal 2 requests purchase of a music CD via the network NT and a network interface 285, the CPU 280 of the sales server SV2 performs a process for selling the music CD to the user of the client terminal 2.

That is, in the sales server SV2 with the hardware circuit block configuration, various programs to be stored in the ROM 281 or the hard disk drive 282 are appropriately selected according to the functions of the sales server SV2 with the functional circuit block configuration described above with reference to FIG. 6, which can cause the CPU 280 to function like the control unit 90, the communication controller 92, the authentication processor 95, and the searching unit 99 of the sales server SV2, and use the hard disk drive 282 like the customer database unit 94, the page information storage unit 96, the authentication information storage unit 97, the package medium information storage unit 98 of the sales server SV2.

(1-12) Configuration of Radio Broadcast Information Distribution Server

Figure 19:
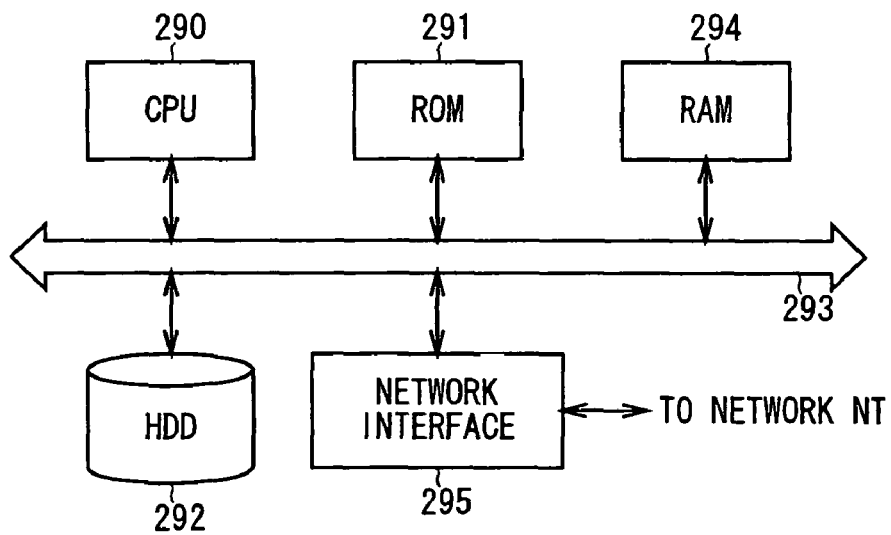
FIG. 19 is a block diagram showing the configuration of the radio broadcast information distribution server by using hardware circuit blocks.

The radio broadcast information distribution server SV3 shown in FIG. 19 performs a process for providing a radio broadcast information distribution service in such a manner that a CPU 290 controlling entire operation puts a basic program and various programs being stored in a ROM 291 or a hard disk drive 292 in a RAM 294 via a bus 293 and runs them.

For example, the hard disk drive 292 of the radio broadcast information distribution server SV3 stores On Air list information indicating information on already broadcasted radio programs, Now On Air information indicating information on radio programs currently broadcasted, etc.

When the CPU 290 of the radio broadcast information distribution server SV3 receives a request signal requesting On Air list information or Now On Air information, via the network NT and a network interface 295 from the client terminal 2, it reads the On Air list information or the Now On Air information from the hard disk drive 292 according to the request signal, and transmits this to the client terminal 2 via the network interface 295.

That is, even in the radio broadcast information distribution server SV3 with the hardware circuit block configuration, various programs to be stored in the ROM 291 or the hard disk drive 292 are appropriately selected according to the functions of the radio broadcast information distribution server SV3 with the functional circuit block configuration described above with reference to FIG. 7, which can cause the CPU 290 to function like the control unit 110, the communication controller 112, the authentication processor 115, and searching unit 118 of the radio broadcast information distribution server SV3 and also use the hard disk drive 292 as the customer database unit 114, the page information storage unit 116, the On Air list information storage unit 117, the Now On Air information storage unit 119 and the authentication information storage unit 120 of the radio broadcast information distribution server SV3.

(1-13) Configuration of Radio Broadcast Information Database

By the way, the radio broadcast information distribution server SV3 actually manages Now On Air information and On Air list information, which are managed by a corresponding radio station and indicate radio programs broadcasted from the radio stations, in a radio broadcast information database created in the hard disk drive 292 (FIG. 19).

FIG. 20 shows the structure of the radio broadcast information database. The radio broadcast information database has an ongoing program table TB1 for managing Now On Air information, and a broadcasted music table TB2 and a broadcasted program table TB3 for managing On Air list information.

The ongoing program table TB1 contains Now On Air information including the name of a radio station corresponding to the radio broadcast information distribution server SV3, the broadcasting time (date, start time and end time) of a radio program being broadcasted from the radio station, the program title, the cast (DJ (Disk Jockey)) names, and the broadcasting start time (including date), and the title, the artist name and the genre of a song currently playing in the radio program.

That is, the ongoing program table TB1 stores Now On Air information on a currently broadcasted radio program and song currently playing in the program.

In addition, the broadcasted music table TB2 contains On Air list information including the name of a corresponding radio station, and the broadcasting time (date and start time), and the titles, the artist names, and the genres of the songs broadcasted in the radio programs of the radio station.

That is, the broadcasted music table TB2 stores On Air list information on songs broadcasted in the radio programs.

The broadcasted program table TB3 contains On Air list information including the name of a corresponding radio station, and the broadcasting times (date, start time and end time), the titles and the cast (DJ) names of the radio programs broadcasted by the radio station.

That is, the broadcasted program table TB3 stores On Air list information on already broadcasted radio programs.

Actually, when notified of the current broadcasting status (start and end of a radio program, start and end of a song to be broadcasted in the radio program) from a corresponding radio station, the CPU 290 (FIG. 19) of the radio broadcast information distribution server SV3 updates the ongoing program table TB1 based on the broadcasting status as shown in FIG. 21.

That is, at timing when a radio program is finished and switched to a next radio program or when a song being broadcasted in a radio program is switched to a next song, the Now On Air information being stored in the ongoing program table TB1 is updated.

Therefore, the ongoing program table TB1 stores almost real-time Now On Air information showing the current broadcasting status. When a song is not broadcasted in a radio program, the ongoing program table TB1 may store null data indicating that no song is broadcasted now, or may keep Now On Air information on the song broadcasted last until a next song starts.

Then when receiving a Now On Air information acquisition request from the client terminal 2, the CPU 290 transmits the Now On Air information being stored in the ongoing program table TB1 to the client terminal 2 via the network interface 295.

When a prescribed time period (for example, several minutes) passes after a song ends in a program, the CPU 290 adds On Air list information on the song in the broadcasted music table TB2 as shown in FIG. 22.

In addition, when a prescribed time period (for example, several minutes) passes after a radio program ends, the CPU 290 adds On Air list information on the radio program in the broadcasted program table TB3 as shown in FIG. 23.

Then when receiving an acquisition request for On Air list information for a prescribed time period (for example, for yesterday), the CPU 290 associates the broadcasting times in the broadcasted music table TB2 with the broadcasting times in the broadcasted program table TB3 as shown in FIG. 24, to thereby associating the On Air list information being stored in the two tables, and extracts and transmits yesterday On Air list information to the client terminal 2 via the network interface 295.

Therefore, the On Air list information to be transmitted to the client terminal 2 is a list regarding the yesterday radio programs and songs broadcasted in the radio programs.

As described above, the radio broadcast information distribution server SV3 manages Now On Air information and On Air list information including not only the summaries of radio programs such as the titles, the broadcasting times, and the cast (DJ) names of radio programs to be broadcasted from a corresponding radio station, but also the details of the radio programs such as the title, the broadcasting start time, and the artist names of songs to be broadcasted in the radio programs, and is designed to distribute them in response to a request from the client terminal 2.

(1-14) Function to Record Programs by Using on Air List Information or Now on Air Information The client terminal 2 according to this embodiment has a function to create a program table of radio programs based on On Air list information or Now On Air information received from the radio broadcast information distribution server SV3 and record radio programs by using this program table.

Actually, the program recording process of this program recording function is classified into a program table creation process to create a program table based on On Air list information or Now On Air information and a recording scheduling process for scheduling recording of radio programs by using the program tables. These processes will be described in order.

It should be noted that, in the following description, a case where the client terminal 2 accesses the radio broadcast information distribution servers $SV3_1$, $SV3_2$, and $SV3_3$ corresponding to three radio stations preset in the own terminal will be described as one example, but this is just an example because different radio stations are preset in terminals actually.

In addition, in this program table creation program, the client terminal 2 obtains On Air list information or Now On Air information from the radio broadcast information distribution server SV3 ($SV3_1$, $SV3_2$, $SV3_3$). Since its acquisition method and authentication method have been described above and description for these will be omitted.

(1-14-1) Program Table Creation Process

Figure 25:
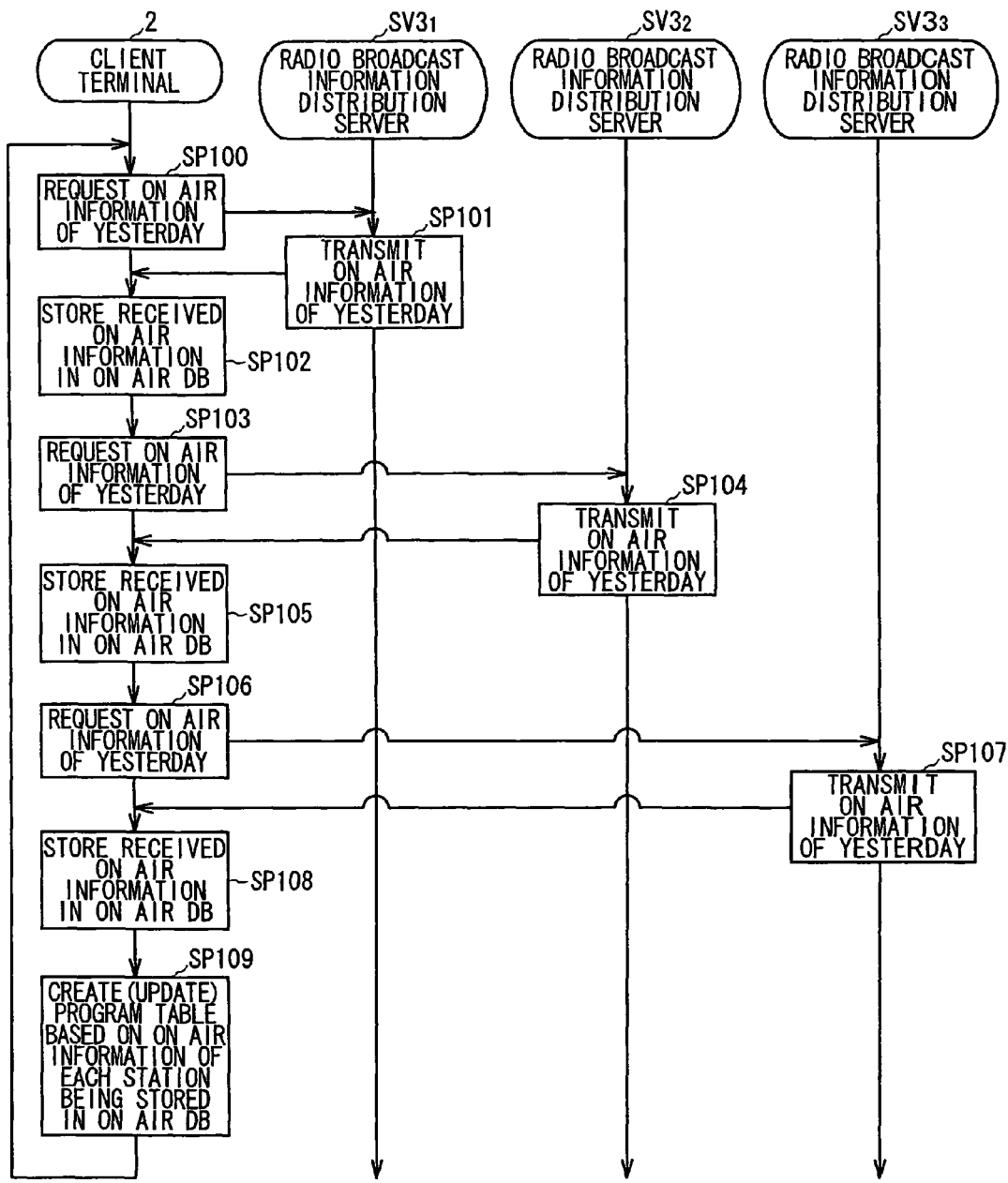
FIG. 25 is a sequence chart showing a program table creation process using On Air list information.

For this program table creation process, there are two cases: one is that a program table is created based on On Air list information, and the other is that a program table is created based on Now On Air information. The latter case where a program table is created based on On Air list information will be described first with reference to FIG. 25.

In this connection, this program table creation process has a processing sequence between the client terminal 2 and the radio broadcast information distribution servers $SV3_1$, $SV3_2$, and $SV3_3$, which is realized by the CPU 203 of the client terminal 2 and the CPU 290 of each radio broadcast information distribution server $SV3_1$, $SV3_2$, $SV3_3$.

When the client terminal 2 recognizes based on the current time obtained by a locally provided timer circuit (not shown) a preset time for receiving On Air list information (for example, 1:00 a.m.), it transmits a request signal for On Air list information of yesterday to the radio broadcast information distributions server $SV3_1$ at step SP100.

When the radio broadcast information distribution server $SV3_1$ receives the request signal from the client terminal 2, it extracts the yesterday On Air list information from a local radio broadcast information database, and returns it to the client terminal 2 at step SP101.

When the client terminal 2 receives the yesterday On Air list information from the radio broadcast information distribution server $SV3_1$, it stores the information in an On Air list information database ODB (shown in FIG. 26) previously created in the hard disk drive 211 at step SP102, and goes on to step SP103.

At step SP103, the client terminal 2 transmits request information requesting On Air list information of yesterday to the radio broadcast information distribution server $SV3_2$.

When the radio broadcast information distribution server $SV3_2$ receives the request signal from the client terminal 2, it extracts the yesterday On Air list information from a local radio broadcast information database, and returns it to the client terminal 2 at step SP104.

When the client terminal 2 receives the yesterday On Air list information from the radio broadcast information distribution server $SV3_2$, it stores the information in the On Air list information database ODB at step SP105, and goes on to step SP106.

At step SP106, the client terminal 2 transmits a request signal requesting On Air list information of yesterday to the radio broadcast information distribution server $SV3_3$.

When the radio broadcast information distribution server $SV3_3$ receives the request signal from the client terminal 2, it extracts the yesterday On Air list information from a local radio broadcast information database, and returns it to the client terminal 2 at step SP107.

When the client terminal 2 receives the yesterday On Air list information from the radio broadcast information distribution server $SV3_3$, it stores the information in the On Air list information database ODB at step SP108, and goes on to step SP109.

In this way, the client terminal 2 receives the yesterday on Air list information from all of the radio broadcast information distribution servers $SV3_1$, $SV3_2$, and $SV3_3$ corresponding to the preset radio stations, and stores them in the On Air list information database ODB, with the result that the On Air list information database ODB stores On Air list information on radio programs broadcasted from the preset radio stations yesterday and songs broadcasted in the radio programs.

At step SP109, the client terminal 2 gathers the On Air list information being stored in the On Air list information database ODB by each radio program title and broadcasting time to create data (hereinafter, referred to as program table data) PD that is a basis of a radio program table, and records this On the hard disk drive 211.

In this case, this program table data PD includes not only the titles, the broadcasting times, and the cast (DJ) names of radio programs broadcasted from the preset radio stations, which are the summaries of the radio programs, but also the titles, the broadcasting start times, and the artist names of songs broadcasted in the radio programs.

After the program table data PD is created in this way, the client terminal 2 goes back to step SP100 and repeats the process of step SP100 to step SP108 for one week, for example, By updating the program table data PD every day, program table data PD for one week is created.

Thus the client terminal 2 can create the program table data PD which is a basis of a program table of radio programs broadcasted from the preset radio stations for the past one week, based on the On Air list information.

Figure 28:
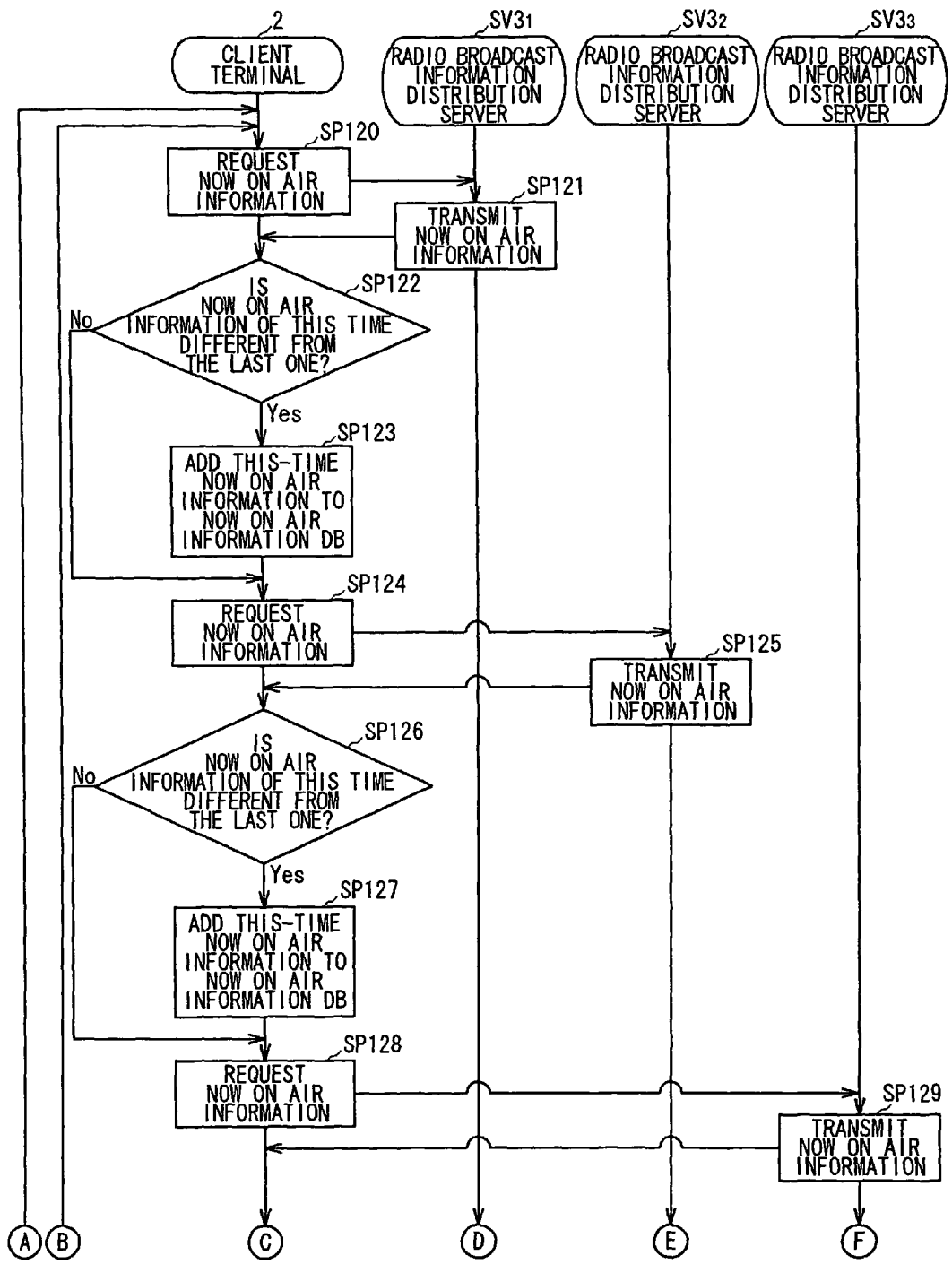
FIG. 28 is a sequence chart showing a program table creation process using Now On Air information.

Next, a case of creating a program table based on Now On Air information will be described with reference to FIG. 28 and FIG. 29. In this connection, the client terminal 2 is designed to send a request for Now On Air information to each radio broadcast information distribution server SV3 ($SV3_1$, $SV3_2$, $SV3_3$) at every prescribed time intervals (hereinafter, referred to as polling intervals and is set to 30 seconds, for example).

When the client terminal 2 is powered on, it transmits a request signal requesting Now On Air information to the radio broadcast information distribution server $SV3_1$, and records this time in the RAM 205 at step SP120.

When the radio broadcast information distribution server $SV3_1$ receives the request signal from the client terminal 2, it extracts Now On Air information from the radio broadcast information database, and returns this to the client terminal 2 at step SP121.

When the client terminal 2 receives the Now On Air information from the radio broadcast information distribution server $SV3_1$, it compares the received Now On Air information with the Now On Air information received from the radio broadcast information distribution server $SV3_1$ last time to determine whether they are different.

A negative result here means that the radio station corresponding to the radio broadcast information distribution server $SV3_1$ does not switch the radio program or a song being broadcasted, between this time and the last time (30 seconds before) and the last received Now On Air information and the this time received Now On Air information are the same. In this case, the client terminal 2 goes on to step SP124.

A positive result at step SP122, on the contrary, means that the radio station corresponding to the radio broadcast information distribution server $SV3_1$ switches the radio program or a song being broadcasted between the this time and the last time (30 second before) and this time received Now On Air information and the last received Now On Air information are different. In this case, the client terminal 2 goes on to step SP123. In this connection, when Now On Air information is received for the first time after power-on, previous Now On Air information does not exist. In this case, a positive result is obtained at step SP122.

At step SP123, the client terminal 2 adds the this-time received Now On Air information in a Now On Air information database NODB (FIG. 26) previously created in the hard disk drive 211, and goes on to next step SP124. In this connection, the Now On Air information database NODB and the above-described On Air list information database ODB have the same structure.

As described above, the client terminal 2 compares the Now On Air information received from the radio broadcast information distribution server $SV3_1$ with the Now On Air information received from the radio broadcast information distribution server $SV3_1$ last time, and only when they are different (that is, a radio program or a song being broadcasted is switched), it adds Now On Air information to the Now On Air information database NODB.

At step SP124, the client terminal 2 transmits a request signal requesting Now On Air information to the radio broadcast information distribution server $SV3_2$.

When the radio broadcast information distribution server $SV3_2$ received the request information from the client terminal 2, it extracts Now On Air information from the radio broadcast information database and transmits it to the client terminal 2 at step SP125.

When the client terminal 2 receives the Now On Air information from the radio broadcast information distribution server $SV3_1$, it compares the received Now On Air information with the Now On Air information received from the radio broadcast information distribution server $SV3_2$ last time to determine whether they are different at step SP126.

Similarly to the case of steps SP122 and SP123, only when the Now On Air information received from the radio broadcast information distribution server $SV3_2$ this time is different from the last received Now On Air information, the client terminal 2 goes on to step SP127 and adds the this time received Now On Air information to the Now On Air information database NODB, and goes on to next step SP128.

At step SP128, the client terminal 2 transmits a request signal requesting Now On Air information to the radio broadcast information distribution server $SV3_3$.

When the radio broadcast information distribution server $SV3_3$ receives the request signal from the client terminal 2, it extracts the Now On Air information from the radio broadcast information database and returns it to the client terminal 2 at step SP129.

Figure 29:
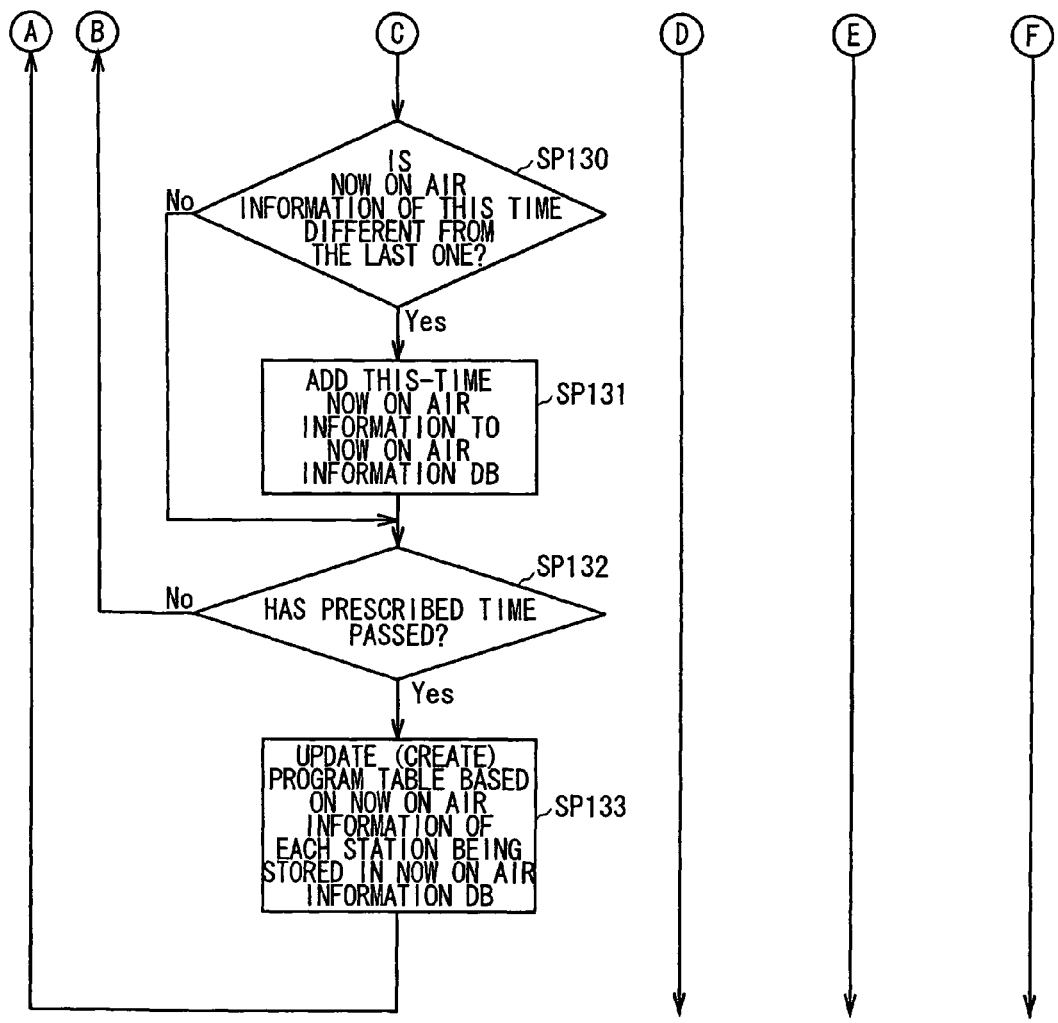
FIG. 29 is a sequence chart that follows the sequence chart showing the program table creation process using the Now On Air information in FIG. 28.

When the client terminal 2 receives the Now On Air information from the radio broadcast information distribution server $SV3_3$, it compares the received Now On Air information with the Now On Air information received from the radio broadcast information distribution server $SV3_3$ last time to determine whether they are different at step SP130 (FIG. 29).

Then similarly to the case of steps SP126 and SP127, only when the Now On Air information received from the radio broadcast information distribution server $SV3_3$ this time is different from the last-time received Now On Air information, the client terminal 2 goes on to step SP131, adds the this time received Now On Air information to the Now On Air information database NODB, and goes on to step SP132.

At step SP132, the client terminal 2 determines based on the time stored in the RAM 205 whether a prescribed time period (for example, one hour) passes after the first Now On Air information request is transmitted.

When a negative result is obtained, the client terminal 2 goes back to step SP120 and repeats the processes of step SP120 to step SP132 to store Now On Air information on the radio programs and songs broadcasted from the preset radio stations for the past one hour, in the Now On Air information database NODB.

As described above, the client terminal 2 receives Now On Air information from all of the radio broadcast information distribution servers SV3$_1$, SV3$_2$, and SV3$_3$ corresponding to the preset radio stations at polling intervals, and only when received Now On Air information is different from last received Now On Air information, it adds this in the Now On Air information database NODB. As a result, the Now On Air information stores information which is almost equivalent to that in the above-described On Air information database ODB.

Figure 27:
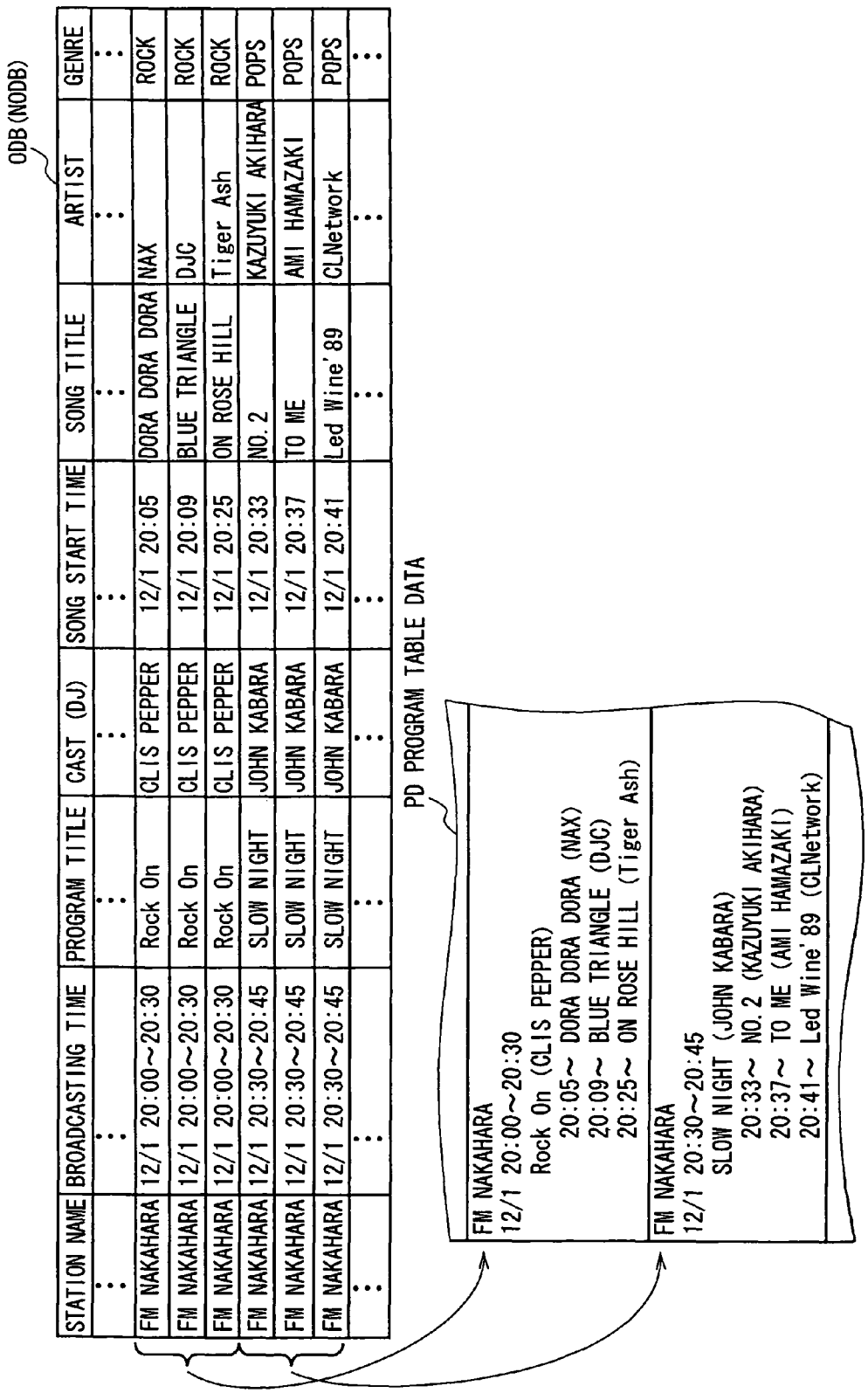
FIG. 27 is a schematic diagram showing how to create program table data.

When a positive result is obtained at step SP132 because one hour has passed, the client terminal 2 goes on to next step SP133, and gathers the Now On Air information being stored in the Now On Air information database NODB by each radio program title and broadcasting time, to create program table data PD (FIG. 27) which is a basis of a radio program table and store it on the hard disk drive 211.

After the program table data PD is created, the client terminal 2 goes back to step SP120, repeats the process of step SP120 to step SP133 for one week, for example. By updating the program table data every one hour, the program table data PD for one week is created.

Thus the client terminal 2 is capable of creating the program table data PD which is a detailed program table of radio programs broadcasted from the preset radio stations for the past one week, based on the Now On Air information, similarly to a case of using On Air list information.

(1-14-2) Recording Scheduling Process

Figure 30:
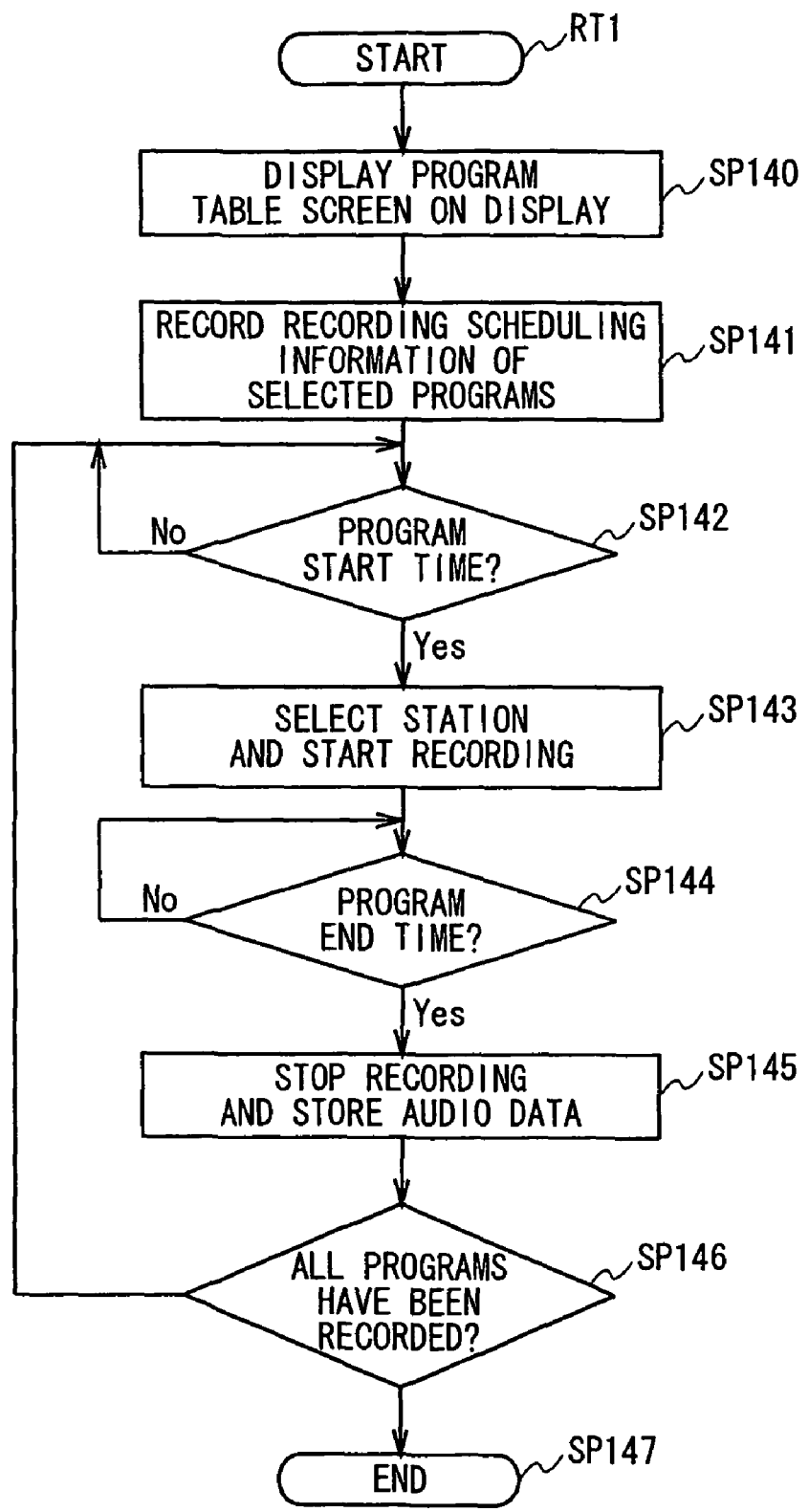
FIG. 30 is a flowchart showing a recording scheduling process.

A recording scheduling process of scheduling recording of user desired radio programs by using program table data PD created in the program table creation process will be now described with reference to FIG. 30.

When the client terminal 2 recognizes that a recording scheduling command has been entered via the operation input unit 200, it executes a recording scheduling process RT1, and reads program table data PD from the hard disk drive 211 and displays a program table screen 300 (FIG. 31) based on the program table data PD on the display 206 at step SP140, and goes on to next step SP141.

This program table screen 300 is a screen which is used by a user to select radio programs to be recorded, which shows a program table 301 in which a horizontal axis (that is, row) shows preset radio stations and a vertical axis (that is, line) shows broadcasting times (including dates).

In this program table 301, the program titles of the radio programs broadcasted for the past one week are displayed at a position of the corresponding radio station name (row) and the corresponding broadcasting time (line) of the program table 301, together with the broadcasting time and cast (DJ) names of the programs, the titles, the broadcasting start times and the artist names of songs broadcasted in the radio programs.

Therefore, by displaying the program table screen 300 on the display 206, the client terminal 2 can show a user not only the program titles, the broadcasting times, and the cast (DJ) names of the broadcasted radio programs, which are the summaries of the radio programs, but also the titles, the broadcasting start times and the artist names of songs broadcasted in the radio programs which are the detailed information on the radio programs.

Further, the program table 301 has check boxes CB for scheduling recording of radio programs next to the display positions of the program titles.

Thereby the user checks the check boxes CB corresponding to desired radio programs with a cursor operable with the operation input unit 200, which is not illustrated, to select the radio programs for scheduling recording.

The client terminal 2 recognizes that a setting button PB on the program table screen 300 has been pressed under a condition that one or more radio programs are selected, it records information (hereinafter, referred to as recording scheduling information) including the program title, the radio station name, the broadcasting start time and the broadcasting end time of the selected radio program in association with each other, on the hard disk drive 211 at step SP141, and goes on to step SP142.

At step SP142, the client terminal 2 waits until the broadcasting start time of the radio program scheduled for recording comes, based on the recording scheduling information, and when it recognizes that the broadcasting start time of the radio program has come, it goes on to next step SP143.

At step SP143, the client terminal 2 tunes the tuner 213 to the frequency of the radio station broadcasting the radio program scheduled for recording and starts the recording of the radio program being broadcasted from the radio station, and goes on to step SP144.

At step SP144, the client terminal 2 waits until the broadcasting end time of the radio program being recorded, and when it recognizes that the broadcasting end time of the radio program has come, it goes on to next step SP145.

At step SP145, the client terminal 2 stops the recording of the radio program, stores the audio data obtained by recording the radio program, on the hard disk drive 211 as content data, and goes on to next step SP146.

At step SP146, the client terminal 2 determines based on the recording scheduling information whether the recording of all radio programs scheduled for recording has been done.

When a negative result is obtained here, the client terminal 2 goes back to step SP142 and repeats the process of step SP142 to step SP146 until all radio programs scheduled for recording has been recorded.

Then when an affirmative result is obtained because all radio programs scheduled for recording has been recorded, the client terminal 2 goes on to next step SP147 to complete the recording scheduling process.

(1-15) Operation and Effects

With the above configuration, the client terminal 2 receives, from the radio broadcast information distribution servers SV3$_1$, SV3$_2$, and SV3$_3$ corresponding to preset radio stations, On Air list information or Now On Air information including the program summaries such as the titles, the broadcasting times, and the cast (DJ) names of radio programs broadcasted from the corresponding radio stations and the program details such as the titles, the broadcasting start times, and the artist names of songs playing in the radio programs, and creates program table data PD based on the information.

Then the client terminal 2 displays the program table screen 300 based on the program table data PD on the display 206, to allow a user to select a radio program to be recorded, on the program table screen 300.

Thus the client terminal 2 shows the user the summaries and details of the radio programs broadcasted from the preset radio stations to allow the user to select radio programs to be recorded.

According to the above configuration, the client terminal 2 receives On Air list information or Now On Air information including the program summaries such as the titles, the broadcasting times, and the cast (DJ) names of radio programs and the program details such as the titles, the broadcasting start times, and the artist names of songs playing in the radio programs, and creates program table data PD based on the information, to thereby show the user the program table screen 300 based on the program table data PD including the summaries and details of the radio programs, thus making it possible to allow more preferable radio programs to be selected for recording.

Further, according to the client terminal 2 of this embodiment, the program table data PD is created based on On Air list information or Now On Air information which is basically not information to be used for creating a program table. Therefore, this can show a user the program table screen 300 based on the program table data, including such radio programs that do not provide program table data, thereby making it possible to easily record radio programs by using the program table screen 300.

(2) Other Embodiments

The above embodiment has described a case where program table data PD which is a program table for the past one week is created. This invention, however, is not limited to this and program table data PD for the past one month may be created, or program table data PD for a broadcast period that is specified by a user via the operation input unit 200 may be created.

In this case, for example, program table data PD for the past one month is created and a program table screen 300 based on the program table data PD is displayed on the display 206, which can show a user which songs were used in the radio programs for the past one month. Thereby the user can know the broadcast details of the radio programs for the past one month and the details of broadcast patterns, thus making it possible to select more preferable radio programs for recording based on them.

Further, the above embodiment has described a case where the program table data PD is updated every day (in a case of using On Air list information) or every one hour (in a case of using Now On Air information). This invention is not limited to this and updating can be done at prescribed time intervals. In this case, this prescribed time interval may be previously set in the client terminal 2 or may be specified by a user.

Still further, the above embodiment has described a case where a request signal as request information requesting On Air list information or Now On Air information is transmitted to the radio broadcast information distribution server SV3 (SV3$_1$, SV3$_2$, SV3$_3$) corresponding to each preset radio station. This invention, however, is not limited to this and the user may select a desired radio station out of the preset radio stations with the operation input unit 20, and request information requesting On Air list information or Now On Air may be transmitted to the radio broadcast information distribution server SV3 corresponding to the specified radio station. Since the radio stations that the user is not interested in are not subjected to the program table creation process, waste processes are eliminated.

Still further, the above embodiment has described a case where program table data PD is created based on On Air list information as list information or Now On Air information as ongoing program information, which is distributed from the radio broadcast information distribution server SV3 (SV3$_1$, SV3$_2$, SV3$_3$) which is an external device. This invention, however, is not limited to this and the program table data PD can be created based on other kinds of program information, provided that the program information indicates the summaries and details of radio programs broadcasted from radio stations. For example, not only program information on songs which are content of music programs, like On Air list information and Now On Air information, but also program information on news which is content of news programs may be received from the radio broadcast information distribution server SV3 and the program table data PD may be created based on this information.

Still further, the above embodiment has described a case of recording a radio program. This invention, however, is not limited to this and program information may be received from a server distributing the program information including the summaries and details of television programs and a television program may be recorded by using the program information. This case treats just video as a recording target, instead of audio, so that recording can be done in an almost same process as the above-described program recording process. Since the summaries and details of television programs are shown to a user, the user can select desired television programs for recording, thus making it possible to select more preferable television programs for recording, as compared with a case of using electronic program guide information.

Still further, the above embodiment has described a case where the client terminal 2 has one tuner 213. This invention, however, is not limited to this and the client terminal 2 can have a plurality of tuners. In this case, even when some radio programs in the same time zone are selected on the program table screen 300 being displayed on the display 206 as a display unit, the audio of the radio programs can be simultaneously recorded with the plurality of tuners, thus making it possible to offer much user-friendlier recording.

Still further, the above embodiment has described a case where the client terminal 2 transmits a call sign to the portal server 3, and obtains the address of the radio broadcast information distribution server SV3 distributing Now On Air information and On Air list information on radio programs broadcasted from the radio station corresponding to the call sign, from the portal server 3. This invention, however, is not limited to this and a server for distributing the address of the radio broadcast information distribution server SV3 distributing the Now On Air information and the On Air list information may be separately provided so that the client terminal 2 can receive the address based on the cal sign from the server.

Still further, the above embodiment has described a case of using the hard disk drive 211 as a memory medium for recording the audio of radio programs. This invention, however, is not limited to this and flash memories, CD-Rs (Compact Disk Recordable), and DVD-Rs (Digital Versatile Disk Recordable) may be used as memory media.

Still further, the above embodiment has described a case of providing the above-described program recording function to the client terminal 2 which can record the audio of radio programs on the hard disk drive 211. This invention, however, is not limited to this and the program recording function may be provided to other kinds of devices such as portable terminals which can record radio programs in their internal memories.

Still further, the above embodiment has described a case where the client terminal 2 serving as a recording device and an information processing device has the antenna 212 and the tuner 213 serving as a broadcast signal receiving means, the communication processor 214 and the network interface 215 serving as a communication means serving as a recording means for receiving On Air list information and Now On Air information as reply information, and the CPU 203 serving as a recording means for recording audio data as broadcast data on the hard disk drive 211, a setting means, a program table creation means, a time setting means and a control means. This invention, however, is not limited to this and the client terminal 2 can have another configuration.

Still further, the above embodiment has described a case where radio broadcasts broadcasted from radio stations are applied as broadcasts receivable by the client terminal 2. This invention, however, is not limited to this and the client terminal 2 may receive Internet radio broadcasts or satellite radio broadcasts and obtain related information (radio broadcast information), or the client terminal 2 may receive television broadcasts broadcasted from television broadcasting stations and obtain various kinds of broadcast information on the television programs of the television broadcasts from a server over the Internet.

Still further, the above embodiment has described a case where hardware circuit blocks, functional circuit blocks and program modules are implemented to the client terminal 2. This invention, however, is not limited to this and these may be implemented to other kinds of terminals other than the client terminal 2, such as portable telephones and personal computers. And the terminals can realize the same processes as the client terminal 2 as described above, provided that they have the hardware circuit blocks, the functional circuit blocks and the program modules.

INDUSTRIAL APPLICABILITY

This invention can be widely utilized for recording apparatus that record broadcast programs.

DESCRIPTION OF REFERENCE NUMERALS

1 . . . MUSIC-RELATED SERVICE PROVISION SYSTEM, 2 . . . CLIENT TERMINAL, 3 . . . PORTAL SERVER, 200 . . . OPERATION INPUT SECTION, 201 . . . INPUT PROCESSOR, 203 . . . CPU, 204 . . . ROM, 205 . . . RAM, 206 . . . DISPLAY, 211 . . . HARD DISK DRIVE, 212 . . . ANTENNA, 213 . . . TUNER, 214 . . . COMMUNICATION PROCESSOR, 215 . . . NETWORK INTERFACE, 300 . . . PROGRAM TABLE SCREEN, NT . . . NETWORK, PD . . . PROGRAM TABLE DATA, SV3, $SV3_1$, $SV3_2$, $SV3_3$ . . . RADIO BROADCAST INFORMATION DISTRIBUTION SERVER

The invention claimed is:

1. A recording apparatus comprising:
   broadcast signal receiving means for receiving a broadcast signal transmitted from a broadcasting station;
   setting means for setting at least a broadcasting time period and a broadcasting station;
   communication means for transmitting request information to an external device, the request information requesting at least titles of programs previously broadcasted from the broadcasting station set by the setting means within the broadcasting time period set by the setting means, broadcasting dates and times of the programs, and titles of content broadcasted in the programs, and for receiving reply information returned from the external device in response to the request information, the reply information including at least titles of programs previously broadcasted from the broadcasting station set by the setting means within the broadcasting time period set by the setting means, broadcasting dates and times of the programs, and titles of content broadcasted in the programs;
   program table creation means for creating a program table based on the reply information; and
   recording scheduling means for, when a program previously broadcasted within the broadcasting time period set by the setting means is selected from the program table, scheduling the recording of a program to be broadcast from the broadcasting station set by the setting means based on the title and broadcasting date and time of the selected previously broadcasted program.

2. The recording apparatus according to claim 1, further comprising:
   time setting means for, when a program is selected from the program table created by the program table creation means, setting a recording start time and a recording end time of the program based on a broadcasting date and time of the program;
   a timer for outputting a current time;
   recording means for recording the broadcast signal received by the broadcast signal receiving means in a recording medium as broadcast data; and
   control means for controlling the recording means to start recording of the broadcast data in the recording medium when the recording start time set by the time setting means matches an output of the timer, and controlling the recording means to end the recording of the broadcast data in the recording medium when the recording end time matches the output of the timer.

3. The recording apparatus according to claim 1, wherein:
   the communication means transmits request information to the external device, the request information requesting at least titles of programs previously broadcasted from the broadcasting station set by the setting means within the broadcasting time period set by the setting means, broadcasting dates and times of the programs, titles of content broadcasted in the programs, and the broadcasting start times of the content, and receives list information transmitted from the external device in response to the request information, the list information including at least titles of programs previously broadcasted from the broadcasting station set by the setting means, broadcasting dates and times of the programs, and titles of content broadcasted in the programs; and
   the program table creation means creates the program table based on the list information.

4. The recording apparatus according to claim 3, wherein the communication means transmits request information requesting the list information to at least one external device different for each broadcasting station set by the setting means.

5. The recording apparatus according to claim 1, wherein:
   the communication means periodically transmits request information to the external device and receives ongoing program information transmitted from the external device according to the request information, the request information requesting the ongoing program information including a title of a program being broadcasted from the broadcasting station set by the setting means, a broadcasting date and time of the program, a title of content being broadcasted in the program, and a broadcasting start time of the content; and
   the program table creation means creates the program table based on the ongoing program information.

6. The recording apparatus according to claim 5, wherein the communication means transmits the request information requesting the ongoing program information at prescribed intervals to at least one external device different for each broadcasting station set by the setting means.

7. The recording apparatus according to claim 2, wherein the program table creation means creates the program table every day based on the output of the timer.

8. A recording apparatus comprising:
   a broadcast signal receiving unit configured to receive a broadcast signal transmitted from a broadcasting station;
   a setting unit configured to set at least a broadcasting time period and a broadcasting station;

a communication unit configured to transmit request information to an external device, the request information requesting at least titles of programs previously broadcasted from the broadcasting station set by the setting unit within the broadcasting time period set by the setting unit, broadcasting dates and times of the programs, and titles of content broadcasted in the programs, and receive reply information from the external device in response to the request information, the reply information including at least titles of programs previously broadcasted from the broadcasting station set by the setting unit within the broadcasting time period set by the setting unit, broadcasting dates and times of the programs, and titles of content broadcasted in the programs;

a program table creation unit for creating a program table based on the reply information; and recording scheduling unit configured to, when a program previously broadcasted within the broadcasting time period set by the setting unit is selected from the program table, schedule the recording of a program to be broadcast from the broadcasting station set by the setting unit based on the title and broadcasting date and time of the selected previously broadcasted program.

* * * * *